United States Patent
Wiegand et al.

[19]

[11] Patent Number: 6,099,392
[45] Date of Patent: Aug. 8, 2000

[54] OPTICAL FIBER END-FACE PREPARATION TOOL

[75] Inventors: Gordon Wiegand; William G. Allen; Larry R. Cox; Charles M. Mansfield, all of Austin, Tex.

[73] Assignee: 3M Innovative Properties Company, St. Paul, Minn.

[21] Appl. No.: 08/955,275

[22] Filed: Oct. 21, 1997

Related U.S. Application Data

[63] Continuation-in-part of application No. 08/837,177, Feb. 14, 1997, Pat. No. 5,813,902.

[51] Int. Cl.$^7$ ...................................................... B24B 7/07
[52] U.S. Cl. .............................. 451/41; 451/65; 451/378; 451/384; 451/386; 451/391; 225/2; 225/96.5; 269/287
[58] Field of Search .................................. 451/41, 43, 44, 451/384, 378, 386, 391, 65, 70; 225/2, 96.5; 269/287, 902, 239, 903; 125/23.01

[56] References Cited

U.S. PATENT DOCUMENTS

| | | | |
|---|---|---|---|
| 4,229,876 | 10/1980 | Doty | 225/96.5 |
| 4,463,886 | 8/1984 | Thornton | 225/96.5 |
| 4,473,942 | 10/1984 | Ridgway | 225/2 |
| 4,537,466 | 8/1985 | Moisson et al. | 269/902 |
| 4,621,754 | 11/1986 | Long et al. | 225/2 |
| 5,024,363 | 6/1991 | Suda et al. | 225/96.5 |
| 5,104,021 | 4/1992 | Seike et al. | 225/96.5 |
| 5,321,917 | 6/1994 | Franklin et al. | 451/384 |
| 5,382,276 | 1/1995 | Hakoun et al. | 225/96.5 |
| 5,395,025 | 3/1995 | Borer et al. | 225/96.5 |
| 5,643,064 | 7/1997 | Grinderslev et al. | 451/378 |

FOREIGN PATENT DOCUMENTS

| | | |
|---|---|---|
| 189323 | 7/1986 | European Pat. Off. . |
| 387 583 A2 | 9/1990 | European Pat. Off. . |
| 387 583 A3 | 9/1990 | European Pat. Off. . |
| 568 112 A2 | 3/1993 | European Pat. Off. . |
| 568 112 A3 | 3/1993 | European Pat. Off. . |
| 546936 | 6/1993 | European Pat. Off. . |
| 579521 | 1/1994 | European Pat. Off. . |
| 618466 | 10/1994 | European Pat. Off. . |
| 89 04 579 U | 6/1989 | Germany . |

*Primary Examiner*—Robert A. Rose
*Assistant Examiner*—G. Nguyen
*Attorney, Agent, or Firm*—John A. Fortkort

[57] ABSTRACT

A tool for preparing an optical fiber end-face includes a station having a base with a fiber bender and a scribe for cleaving a fiber. The base may include a polishing surface and a well that serves as a fiber shard collector. A cleaver door may be attached to the base to be rotatable between an open position and a closed position covering the shard collector and may include a mount for releasably attaching a fiber handling tool or puck. The puck includes a body, a latch attached by a hinge to the body, and a face comprising a plate pivotally attached to an end of the body and having a fiber port extending through the plate. The body of the puck includes a nest for receiving a fiber holder for securing a fiber with an end of the fiber extending through the port of the face. The nest includes a reference stop and a means for urging the fiber holder against the reference stop when the latch is rotated to a closed position covering the body. The face of the puck with a fiber end extending through the port can be inserted into guide tracks in the station adjacent the scribe for cleaving the fiber. After the fiber has been cleaved and polished, an adapter holding a magnifier and a light source can be position on the puck for inspecting the fiber.

17 Claims, 17 Drawing Sheets

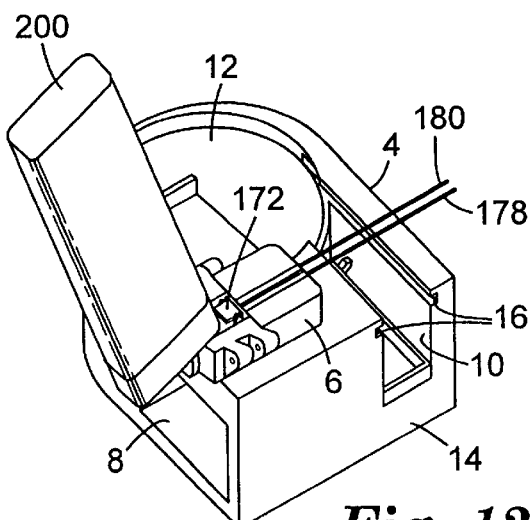
Fig. 12
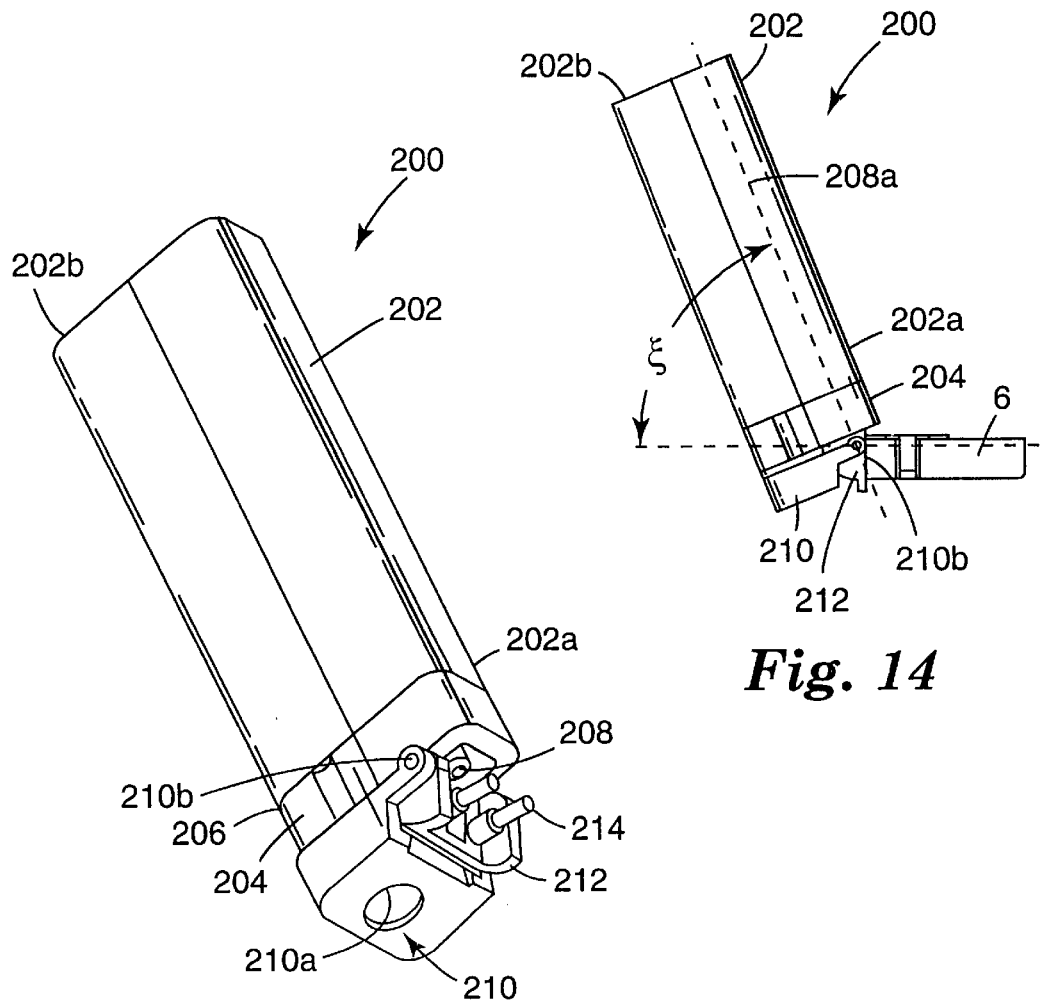
Fig. 14
Fig. 13

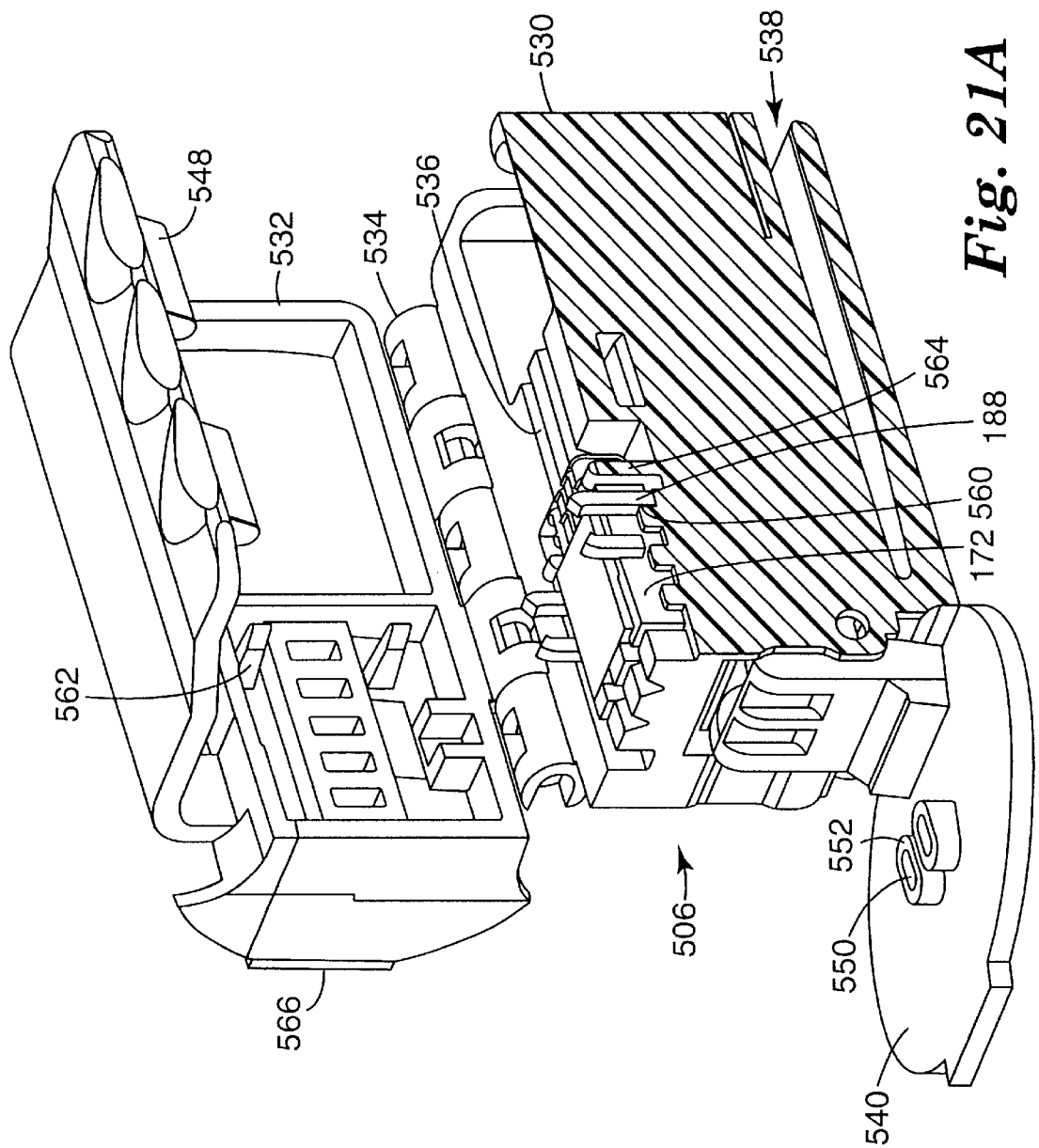

OPTICAL FIBER END-FACE PREPARATION TOOL

CROSS REFERENCE TO RELATED APPLICATIONS

This application is a continuation-in-part of U.S. patent application Ser. No. 08/837,177, now U.S. Pat. No. 5,813,902. This application is also related to U.S. patent application Ser. No. 08/801,058 filed on Feb. 14, 1997, of Sidney J. Berglund, et al., titled "Fiber Optic Connector Spring"; and U.S. patent application Ser. No. 08/577,740 filed on Dec. 22, 1995, of Barbara L. Birrell, et al., titled "Optical Fiber Connector Using Fiber Spring Force and Alignment Groove." These related applications are assigned to the assignee of the present invention and are hereby incorporated herein in their entirety by this reference thereto.

BACKGROUND OF THE INVENTION

The present invention generally relates to systems and methods for preparing and interconnecting communications lines and, more particularly, relates to optical fiber end-face preparation pucks and connector assembly tools and their methods.

In optical fiber networks, it is important that the optical fibers provide true and unimpeded optical transmission quality, even through connection points. The particular connector assemblies for the fibers are important in these regards. A variety of connectors and assembly tools and methods are conventional. Ferrules, such as metal or ceramic ferrules, for example, have been commonly employed elements for terminating optical fibers and providing or cooperating with connective structures for the fibers. Ferrules are typically cylindrical parts with internal passages for accepting an optical fiber end. The fiber end is retained in the ferrule, such as by an adhesive or close tolerance. Certain conventional connective assemblies maintain ferrules containing optical fiber ends in forced contact in order to optically connect the optical fiber end faces.

In lieu of ferrules, various other conventional optical fiber connectors and assembly tools are available. Examples of those connectors and assemblies include the designs shown in the related applications. Particularly, optical fiber end-face connections made in fiber-alignment grooves, such as V-shaped grooves, are disclosed in U.S. patent application Ser. No. 08/801,058 filed on Feb. 14, 1997, of Sidney J. Berglund, et al., titled "Fiber Optic Connector Spring" and U.S. patent application Ser. No. 08/577,740 filed on Dec. 22, 1995, of Barbara L. Birrell, et al., titled "Optical Fiber Connector Using Fiber Spring Force and Alignment Groove." The connectors having fiber-alignment grooves are typically less expensive than connectors requiring ferrules because the ferrules are fairly costly in comparison to the moldable parts making up the fiber-alignment grooved connectors.

In the case of all optical fiber connectors and connections, clean and precise end-face to end-face contact of connecting fibers is critical for superior transmissions. Thus, much efforts and assembly precautions are taken to provide desirable end-face contacts. Conventionally, optical fibers have been cleaved and the end-faces polished to provide desired contact. Various systems and methods of cleaving optical fibers and of polishing the end-faces thereof have been employed with varied results.

With respect to scribing and breaking optical fibers, for example, variations include the angle of the break, the degree of cutting or nicking to perform the scribing, the stresses applied to the fiber during the scribe and break, and others. As for choices in the polishing of end-faces of scribed and broken optical fibers, various pucks, holder elements, and polishing surfaces are possible. One conventional polishing technique has been to fix the fiber end with a ferrule and to hold and manipulate the ferrule to achieve polishing. In those techniques, the optical fiber end-face is moved via the ferrule across the polishing surface. The fiber end-face is polished away, as well as possibly portions of the ferrule. Another conventional technique has been to grip the fiber, either a ferruled or bare fiber, with a puck. The puck has been a solid, grippable piece with a flat surface. A passage within the puck is perpendicular to the flat surface and serves to accept the fiber (with ferrule, if applicable) to be polished. In the technique, small portions of the fiber protrude from the passage at the flat surface. The flat surface is passed across the polishing surface, thereby polishing away portions of the optical fiber end-face.

The typical polishing techniques present certain problems. A disadvantage in the case of ferruled fibers is that the polishing operation may cause both fiber and ferrule to be polished away. When using a typical polishing puck, a problem has been that the tolerance of the fiber within the puck presents breakage or splintering of the fiber as the flat surface is passed across the polishing surface. Furthermore, it has been difficult to obtain desired polishing results with bare fiber, such as bare fiber to be connected within fiber-alignment grooves, using the prior puck and other polishing systems.

It would be advantageous to not only provide improvements in polishing techniques, but also to provide more suitable systems and methods for in-the-field make-up of optical fiber connections wherein those improvements in polishing techniques are fully realized. Conventionally, ferrule fiber make-up is an involved process that must be undertaken in the manufacturing facility, rather than the field. It is sometimes advantageous, however, to be able to make a connection or other special fiber treatment in the field location. Certain of the conventional plug and socket connectors for optical fibers provide advantages in that field make-up of connections is more easily achieved. In any event of field operations, even with those plug and socket connectors, however, environmental contamination and conditions and lack of extensive facilities and equipment can limit connection assembly capabilities.

Therefore what is needed are systems and methods that ease make-up of optical fiber connections and that provide for improved and advantageous optical fiber end-face polishing to achieve superb optical fiber transmission characteristics with fiber connections. Embodiments of the present invention provide such systems and methods for optical fiber connection make-up with desirable end-face polishing and transmission capabilities. The invention, thus, improves field capabilities in assembling optical fiber connectors and also improves optical performance of optical fiber connections via those connector assemblies.

SUMMARY OF THE INVENTION

The embodiments of the present invention, accordingly, provide systems and methods for assembly of optical fiber connector sockets and for optical fiber polishing. The systems and methods provide advantages of easier and improved assembly of connector sockets in the field and otherwise and enhanced optical performance of the fiber connections because of the fiber end-face polish achievable.

To this end, an embodiment of the invention is a device for polishing an optical fiber at an end-face of the optical fiber. The device includes a body for retaining the optical fiber and a polishing surface attached to the body. The optical fiber protrudes through the polishing surface.

Another embodiment of the invention is a device for preparing an optical fiber for interconnection. The device comprises means for grasping the optical fiber at a first location long the optical fiber, means for scribing the optical fiber a first select distance from the first location, means for breaking the optical fiber at the first location, the means for scribing and the means for breaking including guides for supporting and sliding the means for grasping along the guides in fixed relationship to the means for scribing and the means for breaking, and means for polishing the optical fiber as broken, the means for polishing being connected to the means for breaking.

Yet another embodiment of the invention is a method of preparing an optical fiber for interconnection. The method includes steps of retaining the optical fiber within a polishing device from linear movement at a select location along the optical fiber, restraining the optical fiber to limited lateral movement, but allowing linear movement, at an end-face of the optical fiber, and sliding the end-face of the optical fiber across an abrasive surface. The optical fiber bows during engagement of the end-face with the abrasive surface.

Another embodiment of the invention is a method of preparing an optical fiber for interconnection. The method includes steps of grasping the optical fiber within a polishing device at a first location along the optical fiber, scribing the optical fiber at a select location along the optical fiber a select distance from the first location, breaking the optical fiber at the select location, and polishing the optical fiber so broken.

BRIEF DESCRIPTION OF THE DRAWINGS

FIG. 12 is a perspective view of the station base and the polishing puck of FIG. 11 after the end-faces of the optical fibers have been polished and the polishing puck positioned on the retaining ridge of the station base and opened to reveal the fiber holder, wherein a microscope viewer is positioned with the polishing puck for viewing of the optical fiber end-faces, according to embodiments of the present invention.

FIG. 13 is an underside, perspective view of the microscope viewer shown in FIG. 12, according to embodiments of the present invention.

FIG. 14 is a side view of the microscope viewer of FIG. 13, showing the variable angular positioning possible in use, according to embodiments of the present invention.

FIG. 21A is a perspective view of an alternative polishing puck in partial cross-section and with the latch and face open to illustrate the internal structure.

DETAILED DESCRIPTION OF THE PREFERRED EMBODIMENT

Reference is hereby made to the parent and related applications for details of optical fiber connectors, particularly connector sockets, wherein optical fiber connections are made in fiber-alignment grooves. Because details are given in those applications of the connectors, including the connector sockets, the connectors are not discussed herein in detail. The discussion herein focuses primarily on embodiments of systems and methods for optical fiber end-face preparation and connector socket assembly.

Figure 1:
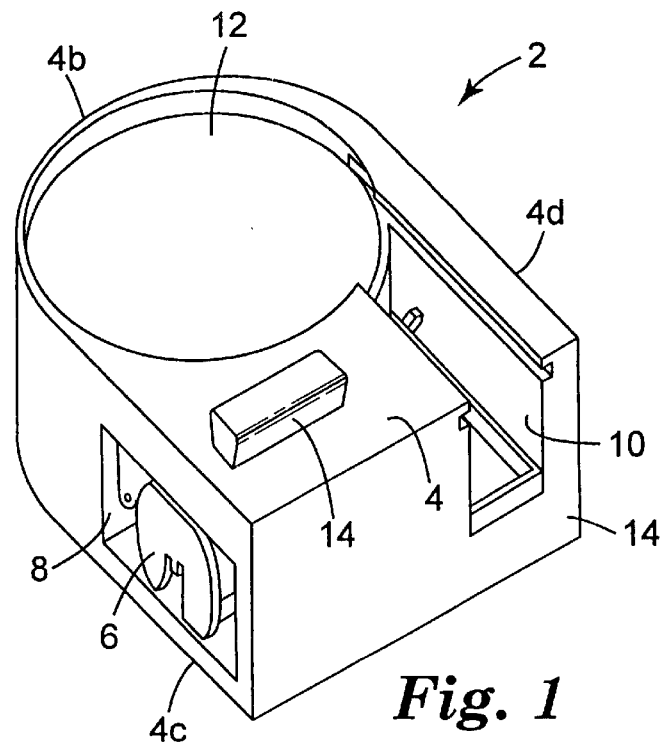
FIG. 1 is a perspective view of an optical fiber end-face preparation and connector assembly station, including a station base and a polishing puck, according to embodiments of the present invention.

Referring to FIG. 1, an optical fiber end-face preparation -and connector assembly station 2 includes a station base 4 and a polishing puck 6. The station base 4 is generally rectangular with a forward planar end 4a and a rearward curved end 4b. Along one side 4c, the station base 4 is formed with a puck storage chamber 8 in which may be stored the polishing puck 6 when not in use preparing optical fiber end-faces and connector socket assemblies. A groove 10 is formed from the forward planar end 4a continuing toward the rearward curved end 4b, but stopping about mid-way through the station base 4. A depth of the groove 10 is on the order of over half a height of the station base 4. The groove 10 opens to a top of the station base 4. At the rearward curved end 4b and atop the station base 4, a polishing surface 12 is positioned. The polishing surface 12 is, for example, circular. Atop the station base 4 at a location not occupied by the groove 10 and the polishing surface 12 is formed a retaining ridge 14. The retaining ridge 14 attaches with the polishing puck 6 to retain the polishing puck 6 in desirable position when preparing optical fiber end-faces and assembling connector sockets.

Figure 2:
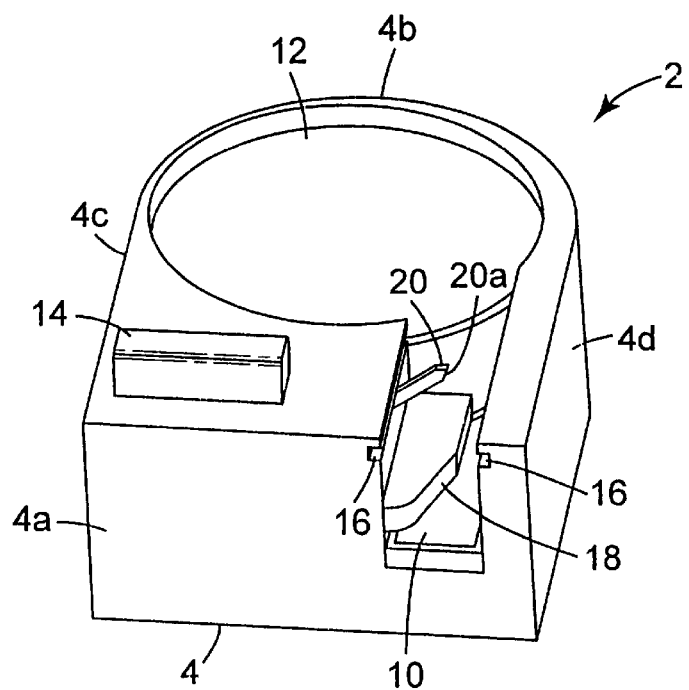
FIG. 2 is a front perspective view of the station base of FIG. 1, showing the optical fiber scribing and cleaving area of the station base, according to embodiments of the present invention.

Referring to FIG. 2, the groove 10 of the station base 4 includes guide tracks 16 on each side of the groove 10 near the top of the station base 4. The guide tracks 16 are suitable to mate with portions of the polishing puck 6 (shown in FIG. 1) to allow sliding movement of the polishing puck 6 in scribing and breaking operations, as will be later discussed. Along a wall of the groove 10 approaching the bottom of the groove 10, a bender portion 18 is located. The bender portion 18 includes a rounded and angled edge beginning near the forward planar end 4a of the station base 4. As the bender portion 18 runs along the groove 10 extending toward the rearward curved end 4b, the bender portion 18 initially extends ever farther across the groove 10. The bender portion 18 does not, however, ever extend the entire width of the groove 10 and reaches a set width on the order of half the width of the groove 10 and continues at that set width in rearward portions of the groove 10.

In addition to the bender portion 18, a scribe 20 is positioned in the groove 10. The scribe 20 is an appendage extending from the wall of the groove 10 from which the bender portion 18 extends, beginning about halfway down the wall of the cleaving groove 18, and is angled upwardly. At about the location of the plane formed by the lower edges of the guide tracks 16, the scribe 20 ends in a generally sharp-angled edge 20a. The sharp-angled edge 20a is selectively situated with relation to the positioning of the polishing puck 6 when positioned in the guide tracks 16, so that the sharp-angled edge 20a contacts circumferences of optical fibers retained by the polishing puck 6 during end-face preparation and connector assembly operations, as will later be described in detail.

In effect, the bender portion 18 causes optical fibers retained by the polishing puck 6 to progressively bend farther and farther away from the wall of the groove 10 on which the scribe 20 and bender portion 18 are attached as the polishing puck 6 is moved in the guide tracks 16 from the forward planar end 4a toward the rearward curved end 4b. As a select bend of the optical fibers is obtained, desirably stressing the optical fibers, the optical fibers are nicked at their circumference near the polishing puck 6 by the sharp-angled edge 20a of the scribe 20. The nick, coupled with additional bending of the optical fibers as the polishing puck 6 continues to progress rearward and the optical fibers follow the bender portion 18, creates a desirable and select scribe and break of the optical fibers.

Figure 3:
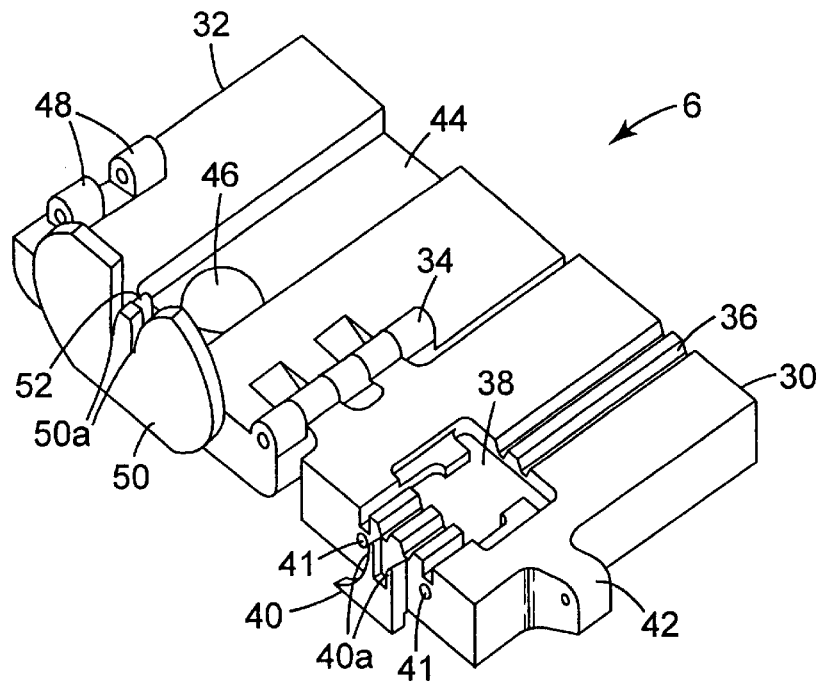
FIG. 3 is a perspective view of the polishing pluck of FIG. 1 in an open position, according to embodiments of the present invention.

Referring to FIG. 3, the polishing puck 6 includes a base 30 and a top 32. The base 30 and the top 32 are connected by a hinge 34. The hinge 34 allows the top 32 to be positioned fully open with respect to the base 30, as shown in FIG. 3, and to be positioned closed, in which the top 32 is in full contact with and over the base 30.

The base 30 includes fiber lead-in grooves 36, for example, two such grooves, in a surface of the base 30. The fiber lead-in grooves 36 extend the length of the base 30, however, the grooves 36 are interrupted in a mid-portion of the base by a socket fiber holder nest 38. The socket fiber holder nest 38 is a generally square cut-out in the surface of the base 30, sufficient to accommodate a socket fiber holder (such as that shown in the related applications and in FIG. 5 hereof). It is of note that the fiber lead-in grooves 36 extend on each side of the socket fiber holder nest 38 and intersect with it. The base also includes a first polishing surface portion 40 positioned adjacent the fiber lead-in grooves 36 at an end of the base 30. Tips 40a of the first polishing surface portion are narrow, grooved (e.g., v-shaped and/or unshaped grooves) surfaces sufficient for resting therein optical fibers which pass through the fiber lead-in grooves 36 at the end of the base 30. The base 30 is also equipped with viewer mounting holes 41 at the end near the first polishing surface portion 40 and a clasp extension 42 along an edge opposite the hinge 34.

At the hinge 34, the top 32 hingedly mates with the base 30. The top 32 includes a cut-out 44 that extends along almost the entire length of the top 32 in a mid-section thereof, on a side of the top 32 which contacts the base 30 when the top 32 is closed against the base 30. At a forward location in the cut-out 44 which matches with the location of the socket fiber holder nest 38 when the top 32 is closed against the base 30, is formed an actuator pad 46. The actuator pad 46 protrudes outward from within the cut-out 44 sufficient distance to press-fit a socket fiber holder (shown in the related applications and in FIG. 5) assembled in the socket fiber holder nest 38 and is, for example, half-sphere shaped. The top 32 further includes clasp fittings 48 for mating with the clasp extension 42 and securing the top 32 atop the base 30 when the top 32 is closed against the base 30. A second polishing surface portion 50 is affixed at an end of the top 32. At that end, the second polishing surface portion 50 is positioned relative to ridges 52 between the second polishing surface portion 50 and the cut-out 44. The ridges 52 mate with the fiber lead-in grooves 36 of the base 30 when the top 32 is closed against the base 30 and provide tolerance for maintenance of optical fibers within the fiber lead-in grooves 36. The second polishing surface portion 50 includes notches 50a which mate with the tips 40a of the first polishing surface portion 40 when the top 32 is closed against the base 30. At the apex of the tips 40a and the extent of the notches 50a when the first polishing surface portion 40 and the second polishing surface portion 50 are mated, sufficient tolerance between the first polishing surface portion 40 and the second polishing surface portion 50 remains to accommodate optical fibers positioned in the fiber lead-in grooves 36 and passing through the polishing puck 6. The tolerance provided to so accommodate those optical fibers is herein referred to as the "polishing surface holes," and the first polishing surface portion 40 and the second polishing surface portion 50 when mated are sometimes referred to herein as the "polishing surface 40/50."

Figure 4:
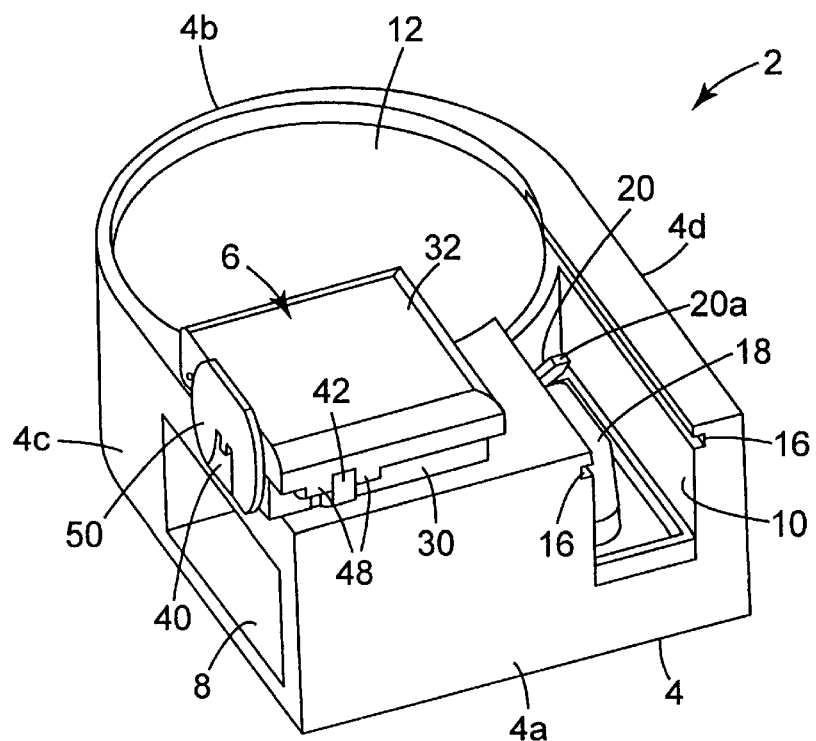
FIG. 4 is a perspective view of the station base and the polishing puck of FIG. 1, wherein the polishing puck is positioned on a retaining ridge of the station base for optical fiber end-face preparation and connector assembly operations, according to embodiments of the present invention.

Referring to FIG. 4, the polishing puck 6 is closed so that the top 32 contacts the bottom 30. The polishing puck 6, in that closed orientation, is positioned on the retaining ridge 14 (shown in FIGS. 1 and 2) of the station base 4. As so positioned, the polishing puck 6 is maintained for optical fiber end-face preparation and connector socket assembly operations. Although not shown in detail in the Figures, the polishing puck 6 includes a groove on an underside of the base 30. That groove mates with the retaining ridge 14 of the station base 4 to secure the polishing puck 6 with the station base 4 during those preparation and assembly operations.

Figure 5:
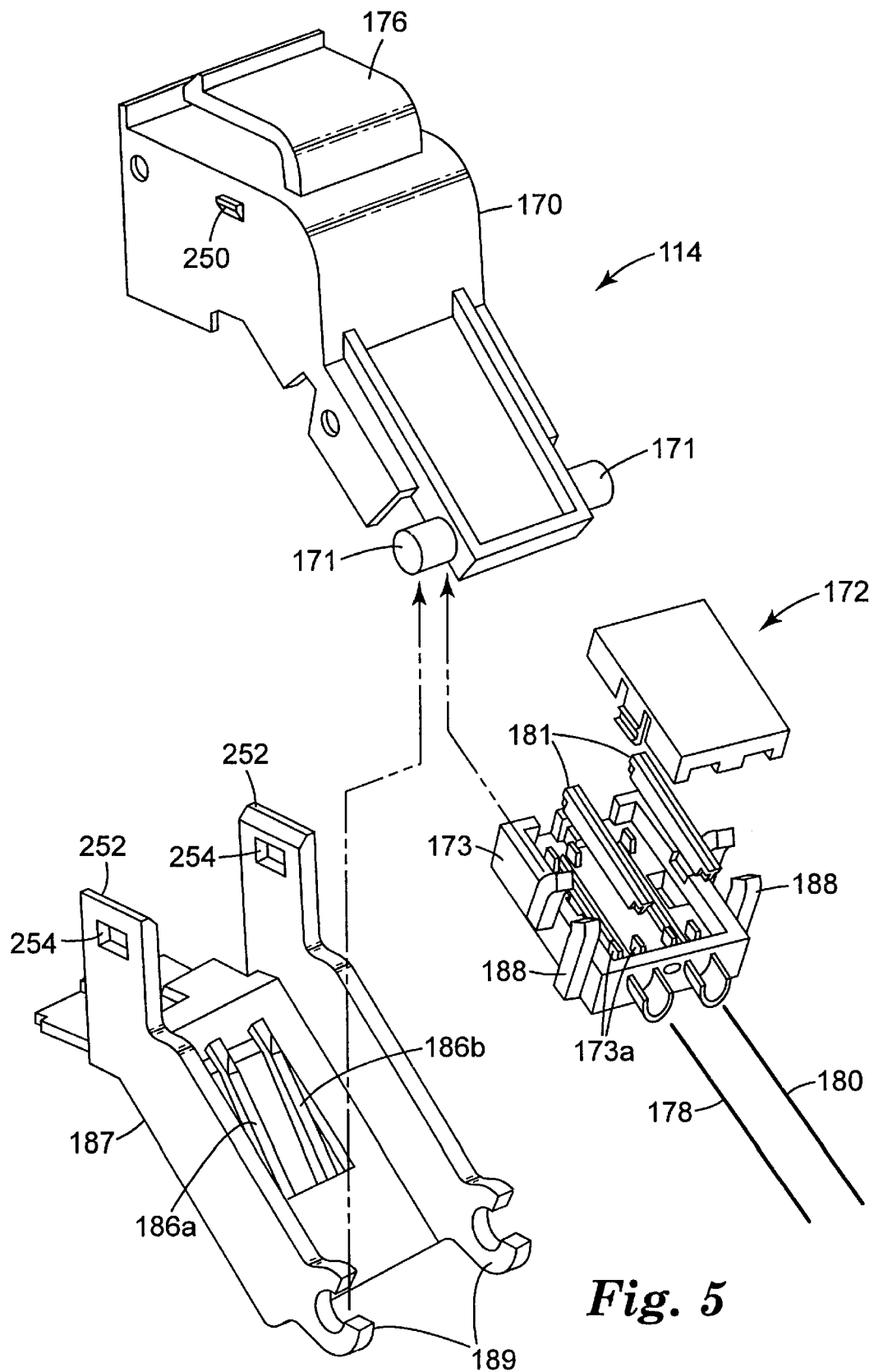
FIG. 5 is an exploded view of a conventional connector socket of the type having fiber-alignment grooves and a fiber holder (also shown in exploded view), which connector socket, including the fiber holder, are preparable using the optical fiber end-face preparation and connector assembly station of FIG. 1, according to embodiments of the present invention.

Referring to FIG. 5, a connector socket 114 of a conventional type which is assemblable using the optical fiber end-face preparation and connector assembly station 2 is shown. The connector socket 114 is more fully discussed and described in the related U.S. patent application Ser. No. 08/801,058 filed on Feb. 14, 1997, of Sidney J. Berglund, et al., titled "Fiber Optic Connector Spring." The connector socket 114 is briefly described here as well, however, because an understanding of the connector socket 114, and particularly a fiber holder 172 thereof, is helpful to an understanding of the features, use, and benefits of the optical fiber end-face preparation and connector assembly station 2.

The connector socket 114 includes a housing 170, the fiber holder 172, and a bottom piece 187. The base 173 has hooks 188 and passageways through opposing walls for passage of optical fibers 178 and 180 therethrough. Internally to the base 173 are several projections 173a extending from the base 173. The projections 173a are selectively spaced to accommodate clamping plates 181. The clamping plates 181 are each formed of a malleable material, for example, a malleable aluminum metal, in a somewhat U-shape. The clamping plates 181 each hold respective ones of the optical fibers 178 and 180 within the U-shape. Because the clamping plates 181 are malleable, they may be crimped (for example, by closing of the polishing puck 6 which effects pressing engagement of the actuator pad 46 with the fiber holder 172 assembly, as hereinafter described) to engage the respective ones of the optical fibers 178 and 180. When so crimped, the clamping plates 181, when located between respective sets of the projections 173a, retain the optical fibers 178 and 180 with the base 173. A cover 179 of the fiber holder 172 includes inserts which fit notches of the base 173 to retain the cover 179 on the base 173 when the inserts and notches are engaged. In certain embodiments, pressing of the cover 179 onto the base 173 to engage the inserts and notches may serve to cause the crimping of the clamping plates 181 necessary to retain the optical fibers 178 and 180.

The fiber holder 172, with the base 173, the clamping plates 181 with the optical fibers 178 and 180 therein, and the cover 179 connected together as described, attaches to posts 171 of the housing 170 via the hooks 188. The hooks 188 snap onto the posts 171, and the fiber holder 172 pivots into place against the underside of the housing 170.

With the fiber holder 172 in place in that manner, outer hooks 189 of the bottom piece 187 snap onto the posts 171 external to the hooks 188. The bottom piece 187, as so engaged by the outer hooks 189 with the posts 171, pivots into place against the housing 170. The bottom piece 187 has upward extensions 252. These upward extensions have holes 254. The housing 170 includes notches 250. The holes 254 mate with the notches 250 when the bottom piece 187 is pressed to the housing 170. When the holes 254 and the notches 250 are so mated, the housing 170, the fiber holder 172, and the bottom piece 187 remain engaged, forming the connector socket 114.

Figure 6:
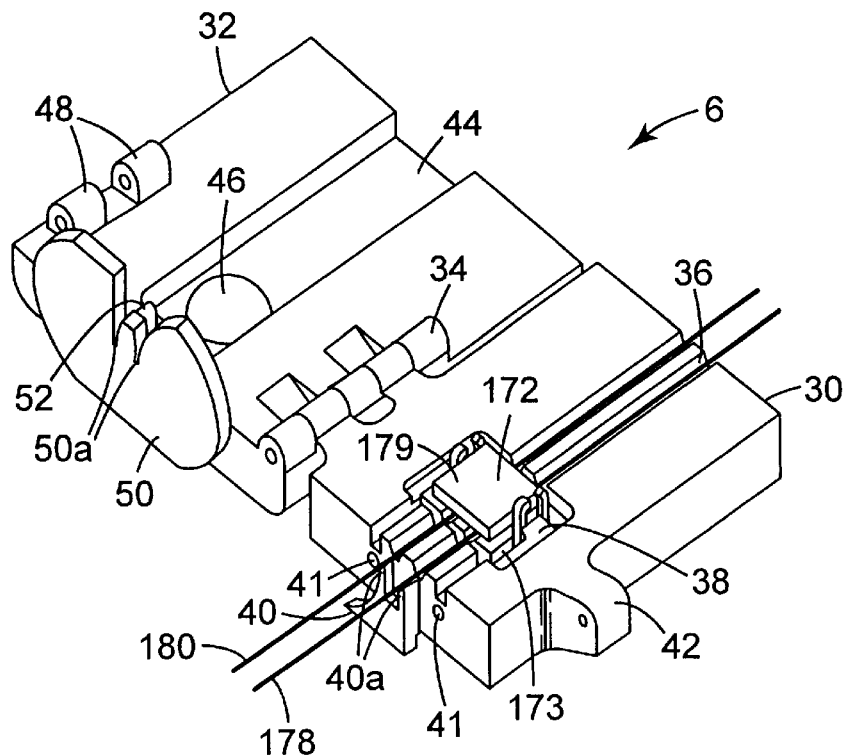
FIG. 6 is a perspective view of the polishing puck of FIG. 1 in open position and in use for assembling the fiber holder of the connector socket of FIG. 5, according to embodiments of the present invention.

Referring to FIG. 6, polishing puck 6 in open position has the fiber holder 172 assembly located in the socket fiber holder nest 38. The fiber holder 172 includes components just described. Optical fibers 178 and 180 extend through the fiber holder 172 and reside in respective ones of the fiber lead-in grooves 36. The optical fibers 178 and 180 extend beyond the grooves 36 and rest on respective ones of the tips 40a of the first polishing surface portion 40. It is to be understood that the fiber holder 172 shown in FIG. 6 is not yet assembled so that the clamping plates 181 are not crimped to hold the optical fibers 178 and 180, and the cover 179, the base 173, and the clamping plates 181 are not engaged as a single unit. Rather, the optical fibers 178 and 180 merely reside within the clamping plates 181, the clamping plates 181 are located between respective sets of projections 173a of the base 173, and the cover 179 sits atop the base 173 but is not engaged via the inserts and notches.

Figure 7:
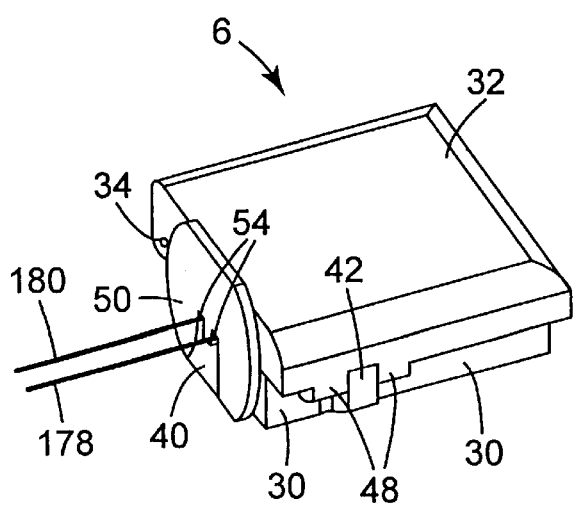
FIG. 7 is a perspective view of the polishing puck of FIG. 6 in closed position and in use for assembling the fiber holder of the connector socket of FIG. 5, according to embodiments of the present invention.

Referring to FIGS. 6 and 7, in conjunction, the polishing puck 6 is in closed position for actuation of assembly of the fiber holder 172 (shown in FIG. 6). The fiber holder 172 continues to reside in the socket fiber holder nest 38, however, the fiber holder 172 has been actuated by force of the actuator pad 46 against the cover 179. That force is exerted by the actuator pad 46 when the top 32 of the polishing puck 6 is closed against the base 30. On such actuation of the fiber holder 172, the clamping plates 181 (shown in FIG. 5) are clamped against the respective optical fibers 178 and 180, the cover 179 and the base 173 are joined by engagement of the inserts and notches thereof, and the clamping plates 181 are fixed within the fiber holder 172 thereby holding the optical fibers 178 and 180 via the fiber holder 172. The optical fibers 178 and 180 extend from the fiber holder 172 through polishing surface holes 54 of the polishing surface 40/50.

Figure 8:
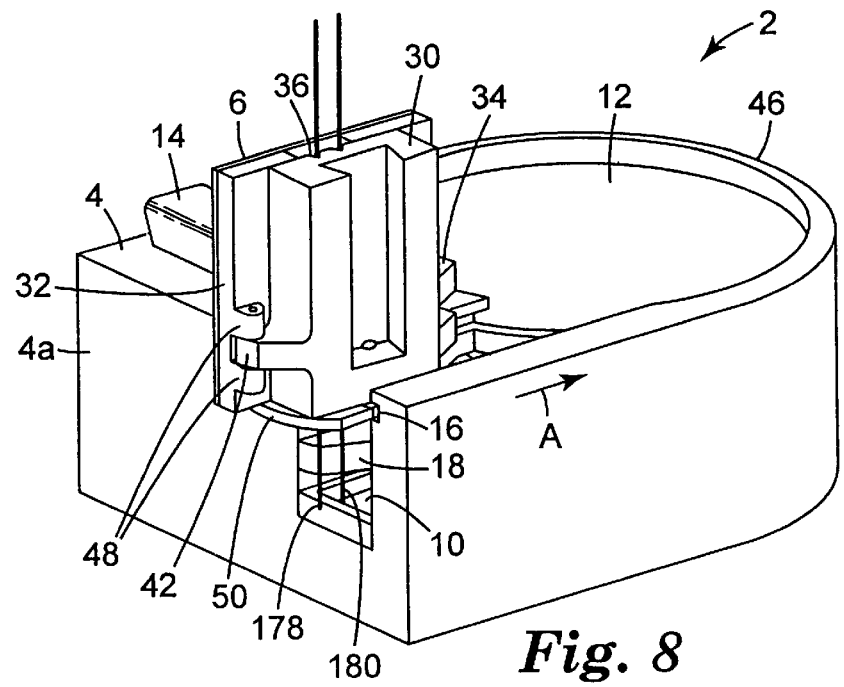
FIG. 8 is a perspective view of the station base of FIG. 1 and the polishing puck of FIG. 7 in use for scribing and breaking optical fibers extending from the polishing puck and maintained by the fiber holder being assembled using the polishing puck, according to embodiments of the present invention.

Referring to FIG. 8, the polishing puck 6 in closed position, for example, having the fiber holder 172 actuated as a unitary piece maintained within the socket fiber holder nest 38 between the base 30 and the top 32, is positioned in the guide tracks 16 of the station base 4. Edges of the polishing surface 40/50 fit within the guide tracks 16 and allow the polishing puck 6 to slide within the guide tracks 16 along the length of the groove 10 of the station base 4. The arrow A in FIG. 8 indicates the direction along the groove 10 in which the polishing puck 6 is moved in order to scribe and break the optical fibers 178 and 180 to continue end-face and connector assembly preparation.

Figure 9A:
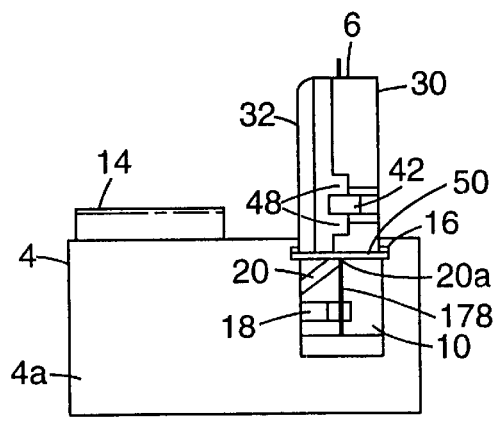
FIGS. 9A–C are front views of the station base and the polishing puck of FIG. 8, wherein the polishing puck is located in several differing positions along a groove of the station base indicative of stages of the scribing and breaking process in preparation of the fiber holder of the connector socket of FIG. 5, according to embodiments of the present invention.
Figure 9B:
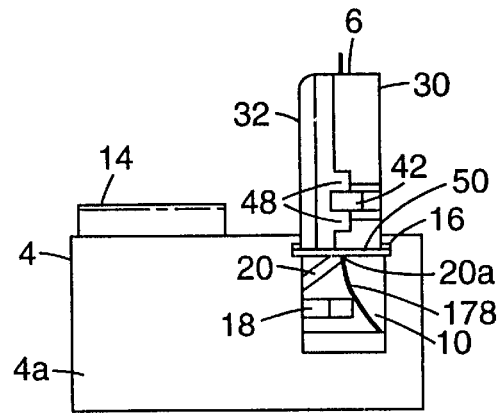
Figure 9C:
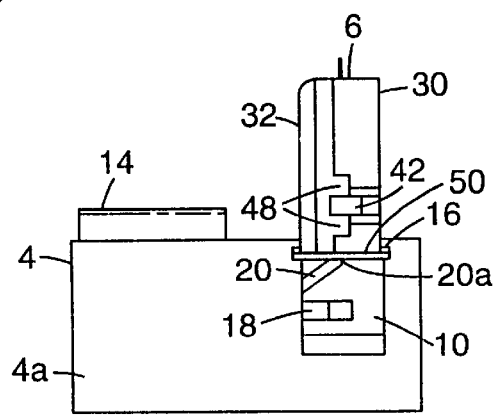

Referring to FIGS. 9A–C, in conjunction with FIG. 8, the polishing puck 6 is positioned in several different orientations with the station base 4 during a scribing and breaking operation. In FIG. 9A, the polishing puck 6 is initially inserted into the groove 10 with edges of the polishing surface 40/50 located in the guide tracks 16. As so initially inserted into the groove 10, the optical fibers 178 and 180 (only optical fiber 178 is shown, although it is to be understood that the optical fiber 180 is located directly in line with the optical fiber 178 and so is not seen in the end views of FIGS. 9A–C) extend substantially straight downward within the groove 10. As the polishing puck 6 is slid along the guide tracks 16 in the direction of arrow A, the optical fiber 178 contacts the bender portion 18, as shown in FIG. 9B. The optical fiber 178 extending from the polishing puck 6 is bent by the bender portion 18. As shown in FIG. 9C, as the polishing puck 6 continues in progression along the guide tracks 16 in the direction of arrow A, the sharp-angled edge 20a of the scribe 20 contacts the optical fiber 178 as it extends from the polishing surface 40/50. In so contacting the optical fiber 178, the sharp-angled edge 20a introduces a flaw in the circumference of the optical fiber 178 under stress from the bend caused by the bender portion 18. The stress of the bend, coupled with the flaw introduced by the sharp-angled edge 20a of the scribe 20, breaks the optical fiber 178 as it just extends through the polishing surface 40/50, for example, the optical fiber 178 protrudes about 10 μm to about 2501 im (i.e., about twice the fiber diameter), from the polishing surface 40/50.

It is appropriate at this point to briefly discuss optical fiber end-face characteristics and preferences for effective optical fiber connections in order to more fully appreciate the advantages of end-face preparation and connector assembly using the embodiments of the optical fiber end-face preparation and connector assembly station 2 of the present invention. In general, there are at least four parameters important to optical quality of optical fiber connections. Those parameters are the optical fiber end-face angle, planarity, surface quality, and location. End-face angle is important for proper contact of optical fiber end-face to optical fiber end-face or optical device connections. Planarity refers to the planar or non-planar shape of the optical fiber end-face. Consistent planarity, whether or not in fact planar, between optical fiber end-face to optical fiber end-face or device connections is important in order to achieve desirable transmission of light across the connections. End-face surface quality refers to the particular characteristics of the glass surface of the optical fiber end-face. A smooth, rather than rough, end-face surface is desired for suitable connections. Optical fiber end-faces are, therefore, commonly polished to achieve smooth end-face surfaces. Another important parameter is end-face location which refers to the distance from the center of the core of an optical fiber to a reference, for example, the distance the optical fiber end-face extends from the fiber holder 172 in the case of the connector socket 114 of FIG. 5. The end-face location is sometimes referred to in the art as "cleave length" in the case of splicing where a length of bare glass is prepared by stripping the fiber coating to the fiber end-face. End-face location is preferably consistent for each of multiple fiber joints where the fiber joints are made with respect to the same reference because of requirements of limited tolerances of most of the typical optical fiber connectors. The embodiments of the optical fiber end-face preparation and connector assembly station 2 of the present invention allow for consistency and precision in the parameters and, thus, provide significant advantages.

Figure 10:
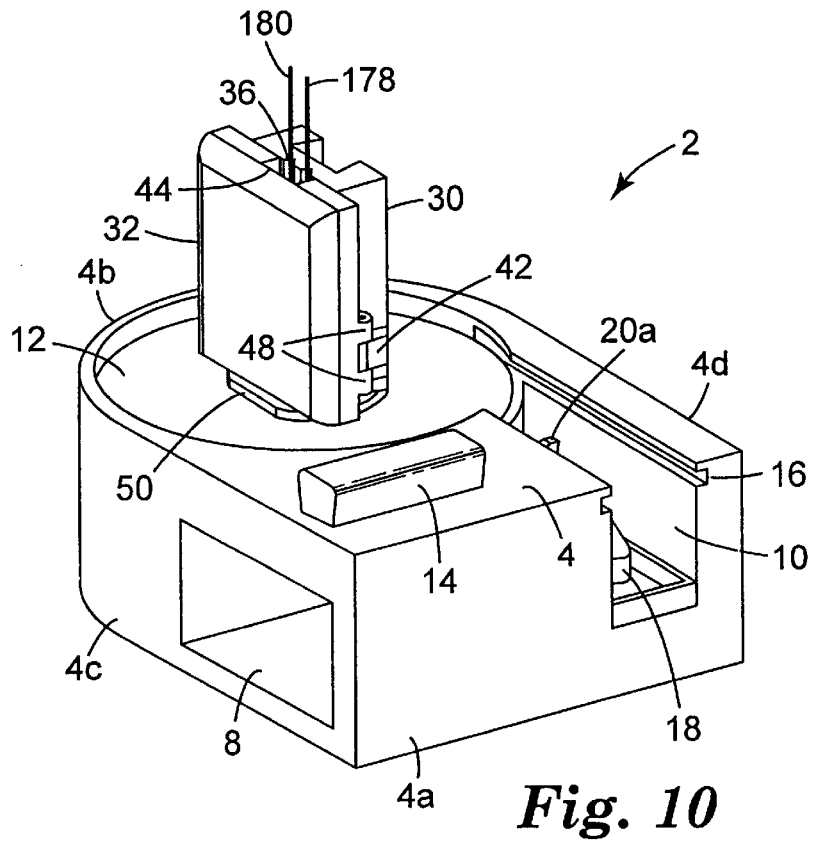
FIG. 10 is a perspective view of the station base and the polishing puck of FIG. 8 in closed position, wherein the polishing puck is being passed across a polishing surface of the station base in order to polish the end-faces of the optical fibers, according to embodiments of the present invention.

Referring to FIG. 10, with respect to polishing the optical fibers 178 and 180 once broken, the station base 4 includes the polishing surface 12. The polishing surface 12 is a circular area covered by a lapping film. The polishing surface 12 is located at the aft end of the groove 10. The guide tracks 16 continue along the groove 10 to the aft end thereof and end at the polishing surface 12. The guide tracks 16 feed onto the polishing surface 12, so that the polishing puck 6, when moved along the guide tracks 16 to the aft end, lands on the polishing surface 12 after passing from the guide tracks 16. The polishing puck 6 is oriented with the polishing surface 40/50 of the polishing puck 6 generally planarity aligned with the polishing surface 12 of the station base 4. The polishing puck 6 is moveable across the lapping film of the polishing surface 12 in that orientation.

Polishing of optical fiber end-faces is conventionally accomplished by skilled craftsmen who by sense of subjective "feel," based on experience, determine when the end-faces are satisfactorily polished. Polishing via the polishing surface 12 and the polishing puck 6 can also be achieved by subjective determination of the craftsman. However, because of the particular design of the optical fiber end-face preparation and connector assembly station 2, the polishing process may be somewhat (or even possibly entirely) rendered non-objective. For example, the optical fiber scribe and break operations with the station base 4 and the polishing puck 6 achieve substantially uniform scribe and break results with respect to the four parameters previously discussed in each scribe and break operation. Because scribe and break results are uniform with the optical fiber end-face preparation and connector assembly station 2, procedures can be established for polishing to achieve substantially consistent polishing results, without reliance on subjectivity of the craftsman. Likewise, polishing results may be optimized and consistently maintained by following the same polishing procedures with the polishing surface 12 in each instance, such as particular polishing patterns, numbers of strokes, and pre-load. Patterns can, for example, be circular, figure eights, linear or other. With each pattern, there is an optimal number of "strokes" to achieve desired polishing results given a particular scribe and break. Pre-load refers to the force that is applied during the polishing process that forces the optical fiber end-face against the lapping film. Pre-load is also consistent among each polishing operation with the optical fiber end-face preparation and connector assembly station 2.

Particularly as to pre-load of the optical fiber being polished using the optical fiber end-face preparation and connector assembly station 2, the pre-load results from the length of optical fiber which protrudes from the polishing surface 40/50 of the polishing puck 6. The polishing puck 6 does not hold the optical fiber rigid at the polishing surface 40/50 because of clearance between the polishing surface 40 and the polishing surface 50 and the optical fiber located there between. Instead, the polishing puck 6 only holds the optical fiber rigid at the socket fiber holder nest 38 (shown in FIG. 6) via the fiber holder 172 (shown in FIG. 6). This allows the optical fiber to bow in the length between the fiber holder 172 and the optical fiber end-face. The stresses resulting from this bow of the optical fiber tend to push the end-face into the abrasive surface of the lapping film with a relatively consistent force. As the polishing puck 6 is maneuvered over the polishing surface 12, glass is removed from the end-face of the optical fiber. As the glass is removed from the end-face during polishing, the length of the optical fiber from the fiber holder 172 to the end-face is shortened, and the bow lessens until the optical fiber straightens when the fiber no longer protrudes from the polishing surface 40/50 of the polishing puck 6 (i.e., the optical fiber end-face is in the same plane as the polishing surface 40/50 adjacent the polishing surface 12) and bow stress is relieved.

Of course, variations in polishing are possible. For example, it is not necessary that polishing be continued until the optical fiber end-face no longer protrudes from the polishing surface 40/50 so as to be in a bow-stress free state. Further, the optical fiber end-face angle tolerance is determined by the dimensions of the polishing surface hole 54. The aspect ratio of the hole 54 is the ratio of the length of the hole 54 (i.e., the thickness of polishing surface 40/50) to the lateral dimension (i.e., the diameter if the hole 54 is circular) of the hole 54. A high value for the aspect ratio provides a more exact and consistent end-face angle from polishing. In another possible configuration, the optical fiber is held at the polishing surface 40/50 by a low durometer elastomer, for example, an elastomer filling the clearance between the optical fiber and the polishing surface hole 54. This limits the possible movement of the optical fiber within the polishing surface hole 54. Stretching of the elastomer when the optical fiber is passed across the lapping film provides the contact pressure for the optical fiber against the abrasive to achieve the polishing. Even further, the polishing surface 12 may be moved with respect to the polishing surface 40/50, or both surfaces 12 and 40/50 may be moved to achieve relative movement.

Figure 11:
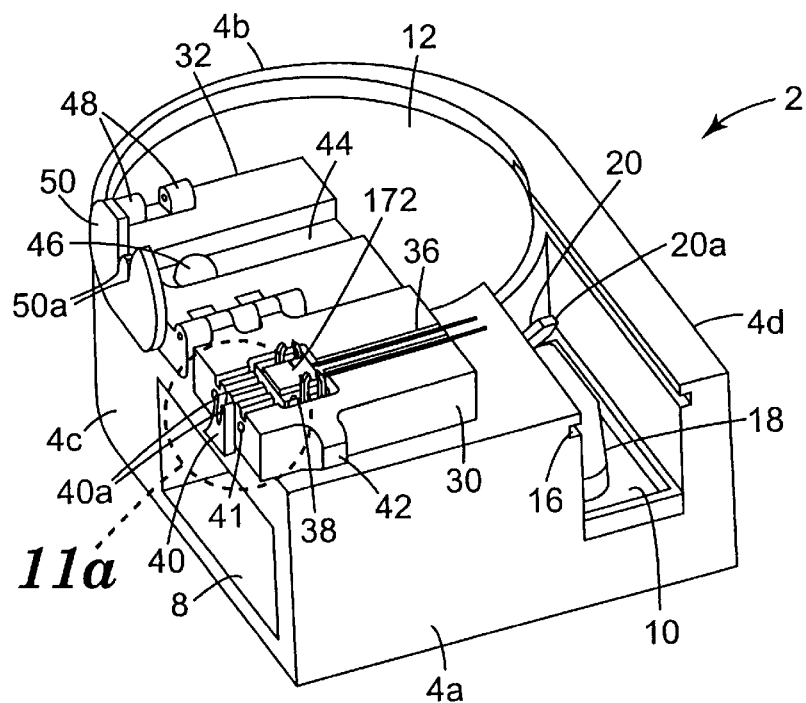
FIG. 11 is a perspective view of the station base and the polishing puck in open position, showing the fiber holder as assembled after scribing and breaking and polishing of the optical fibers extending from the polishing puck.
Figure 11A:
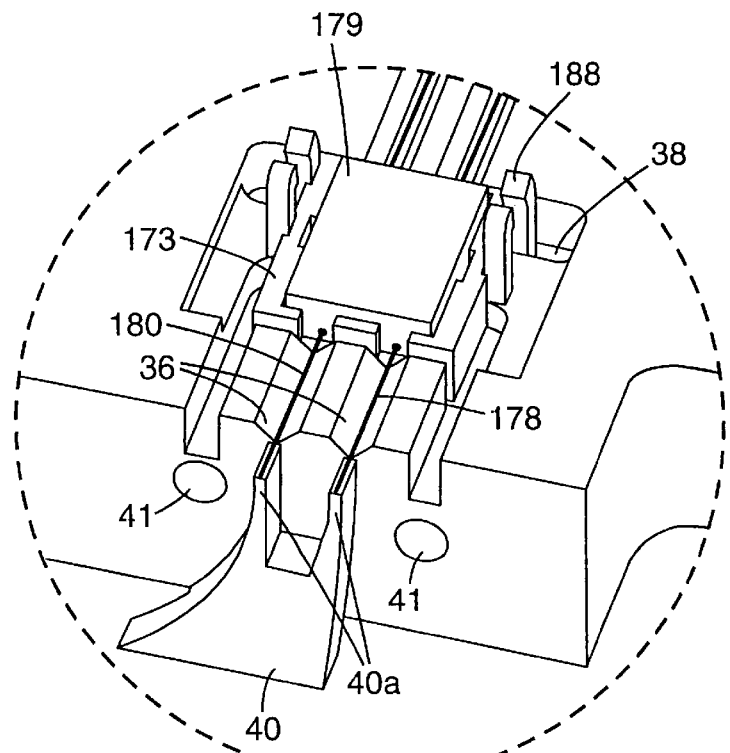
FIG. 11A is a magnified view of the fiber holder and end-faces of the optical fibers after the scribing, breaking, and polishing, all according to embodiments of the present invention.

Referring to FIG. 11, the polishing puck 6 is located on the retaining ridge 14 of the station base 4 and in opened position in order to allow examination of the polished end-faces of the optical fibers 178 and 180 and cleaning. In particular in the magnified view of FIG. 11, the optical fibers 178 and 180 are shown as scribed, broken and polished at the end-faces. The end-faces of the optical fibers 178 and 180 are seen to extend to the plane of the polishing surface 40 at the tips 40*a*. It can be understood that the optical fibers 178 and 180, including their end-faces, can be examined and cleaned because of the arrangement. Of note in FIG. 11 are the viewer mounting holes 41.

Referring to FIGS. 11–13, in conjunction, a microscope viewer 200 is mounted in the viewer mounting holes 41 of the polishing puck 6. The microscope viewer 200 is, for example, a 100× microscope. The microscope viewer 200 includes a microscope housing 202 fitted with a microscope foot 204. The microscope foot 204 is, for example, a clear plastic that allows passage of light. An integral light 206 (not shown in detail) is contained within the microscope foot 204 and directed at the focal point of the microscope viewer 200. A microscope objective 208 is located at an end 202*a* of the microscope housing 202. The end 202*a* of the microscope housing 202 is fitted with a viewer adapter base 210. The viewer adapter base 210 includes a pivot hole 210*a* which mates with the microscope housing 202 in such manner that the microscope housing 202 may be turned side-to-side, for example, in order to view multiple optical fibers in side-by-side relationship, without removing the microscope viewer 200 from the viewer mounting holes 41. A pivot hole 210*b* of the viewer adapter base 210 hinges with a post bracket 212. Because of the pivot hole 210*b*, the viewer adapter base 210 pivots vertically (in the Figures) with respect to the post bracket 212. The post bracket 212 includes posts 214 which are fixed in extension from the post bracket 212. The posts 214 fit within the viewer mounting holes 41 to allow mounting of the microscope viewer 200 on the polishing puck 6.

Referring to FIG. 14, when the microscope viewer 200 is so mounted on the polishing puck 6, the microscope housing 202 is movable with respect to the polishing puck 6. A line of sight 208*a* of the microscope viewer 200 is adjustable over the angle ε. The adjustment over the angle ε is possible because of the hinged relation at the pivot hole 210*b* of the viewer adapter base 210 with the post bracket 212.

Figure 15:
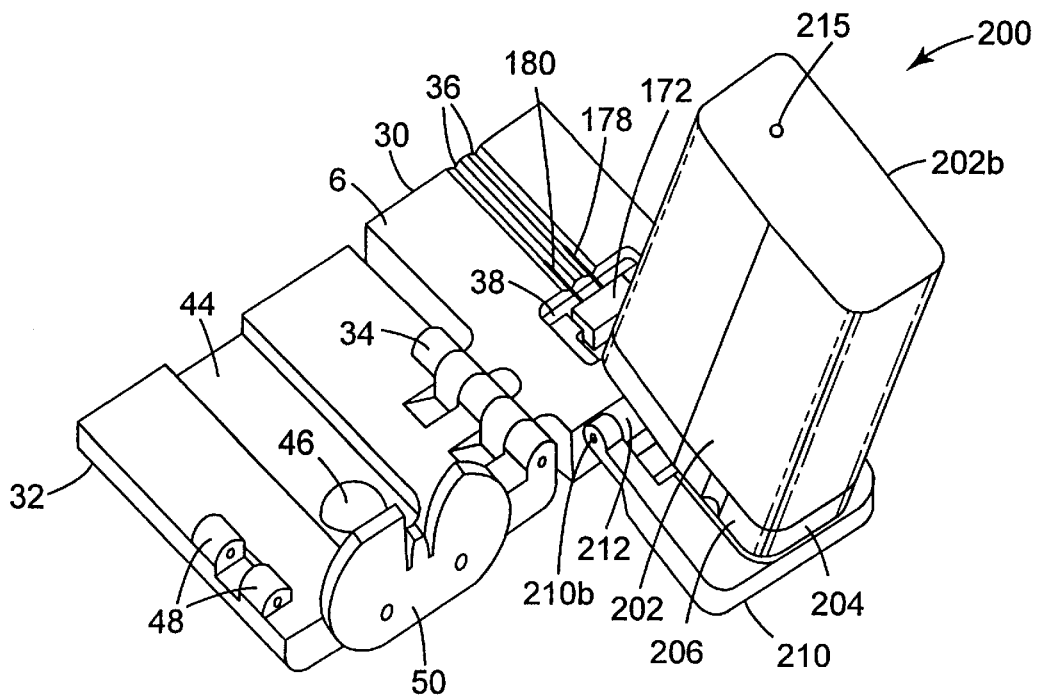
FIG. 15 is a top, perspective view of the microscope viewer and the polishing puck of FIG. 12, showing relative positioning of the microscope viewer and the polishing puck during a typical optical fiber end-face inspection operation, according to embodiments of the present invention.

Referring to FIG. 15, an eye piece 215 of the microscope viewer 200 is located at an end 202*b* of the microscope housing 202 opposite the viewer adapter base 210. The eye piece 215 allows viewing through the microscope viewer 200 of the optical fibers 178 and 180 at tips 40*a* of the polishing surface 40 (shown in FIG. 11) of the polishing puck 6.

Figure 16:
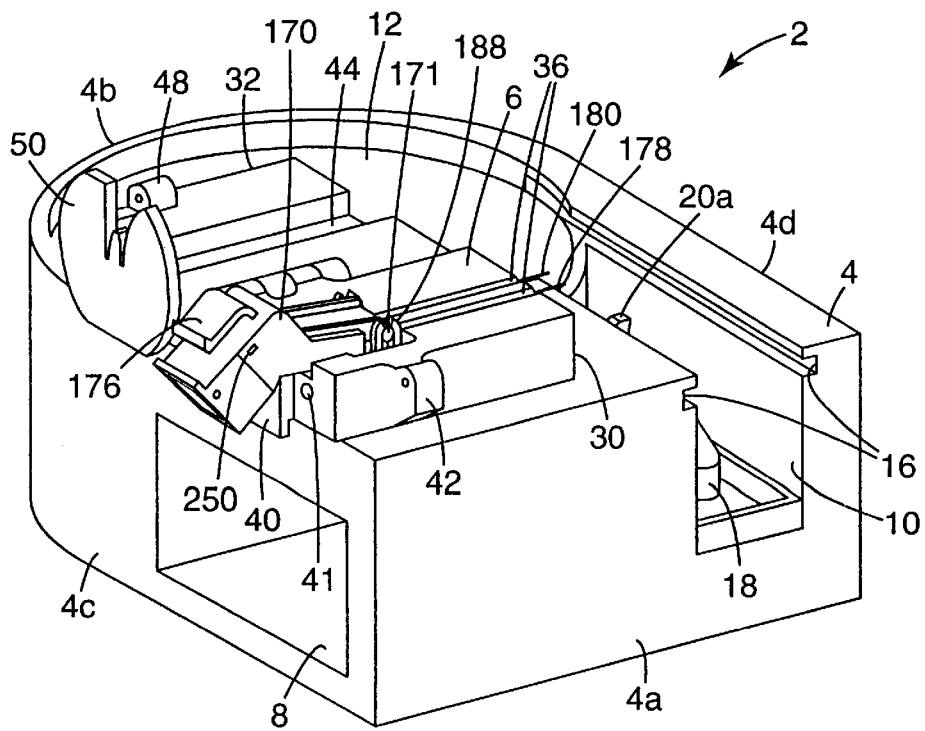
FIG. 16 is a perspective view of the station base and the polishing puck, showing a final stage of the assembly of the connector socket of FIG. 5, as assembled from the fiber holder prepared using the optical fiber end-face preparation and connector assembly station, including the station base and the polishing puck, as shown in FIGS. 1–4, 6–11, and 12–15, according to embodiments of the present invention.
Figure 17:
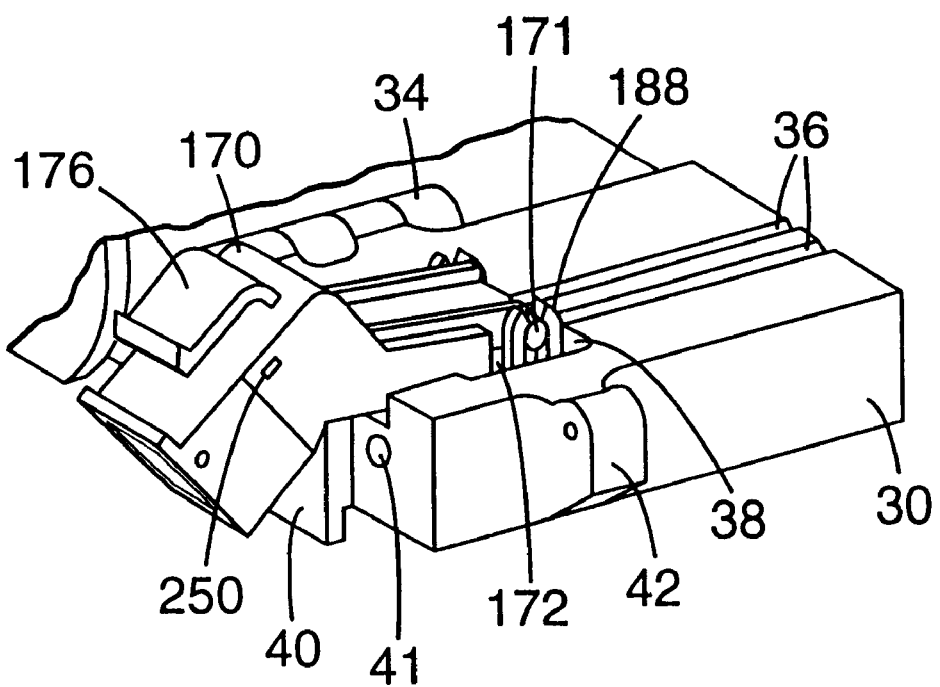
FIG. 17 is a close-up perspective view of the final stage of the assembly of the connector socket shown in FIG. 16, in position with the polishing puck, according to embodiments of the present invention.

Referring to FIGS. 16 and 17, in conjunction, the fiber holder 172 (shown in FIG. 11) is fitted with the housing 170 of the connector socket 114 (shown in FIG. 5) while the fiber holder 172 remains in the socket fiber holder nest 38 of the polishing puck 6. The posts 171 of the housing 170 are snapped into the hooks 188 of the fiber holder 172. The housing 170 and the fiber holder 172 assembly is then removable from the polishing puck 6 and the bottom piece 187 fixable therewith to complete the connector socket 114.

Figure 18:
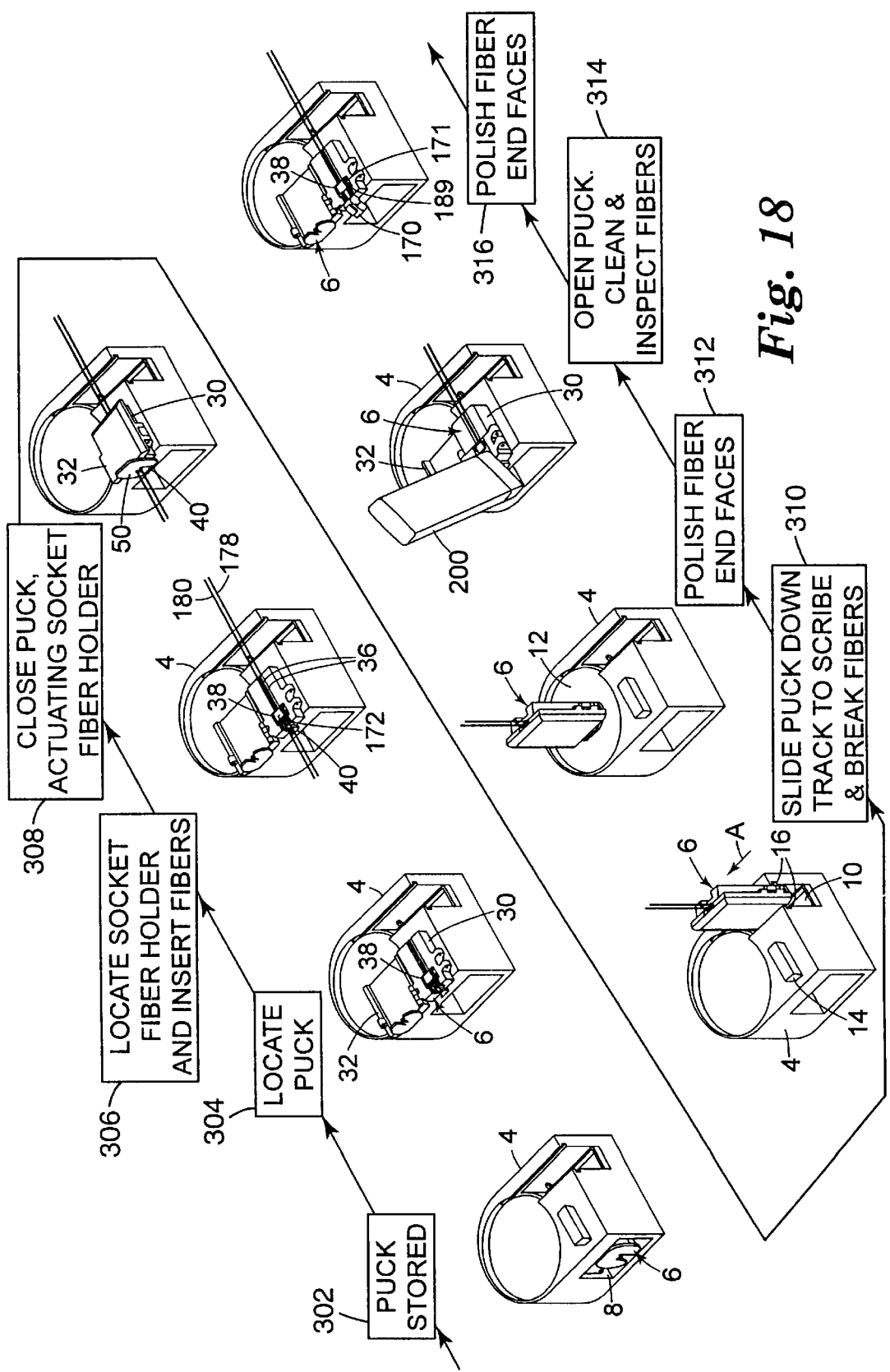
FIG. 18 is a flow diagram of a process of assembling the final stage connector socket of FIG. 5, using the optical fiber end-face preparation and connector assembly station of FIG. 1, and shows the station base and the polishing puck of the assembly station at the various steps of the process.

Referring to FIG. 18, in operation, the optical fiber end-face preparation and connector assembly station 2, including the station base 4 and the polishing puck 6, provides for preparation and completion of optical fiber end-faces and connector socket assemblies. A process 300 for such preparation and completion proceeds as follows. In a step 302, the polishing puck 6 is initially stored in the puck storage chamber 8 of the station base 4. In a step 304, the polishing puck 6 is removed from the storage chamber 8 and mounted on the retaining ridge 14 (shown in FIGS. 1 and 2) of the station base 4. The polishing puck 6 is also opened by rotating the top 32 from the base 30 to reveal the socket fiber holder nest 38.

In a step 306, a fiber holder 172 (shown in FIG. 6) assembly is located in the socket fiber holder nest 38. The optical fibers 178 and 180 are extended through the fiber holder 172 and positioned to reside in respective ones of the fiber lead-in grooves 36 in the base 30 of the polishing puck 6. The optical fibers 178 and 180 extend beyond the polishing surface 40 of the polishing puck 6. The fiber holder 172 in the step 306 is not yet engaged or actuated as a single unit. Instead, the component parts of the fiber holder 172 are merely located in the socket fiber holder nest 38 with the optical fibers 178 and 180, and oriented for engagement on actuation.

In a step 308, the top 32 of the polishing puck 6 is closed against the base 30 of the polishing puck 6. By so closing the top 32, the top 32, via the actuator pad 46 (shown in FIGS. 6 and 7), actuates the fiber holder 172 contained within the socket fiber holder nest 38 to engage the fiber holder 172 as a single unit. In the step 308, the clamping plates 181 clamp the optical fibers 178 and 180 and the cover 179 engages the base 173, so that the optical fibers 178 and 180 are fixed with the fiber holder 172.

In a step 310, the polishing puck 6 is removed from the retaining ridge 14 of the station base 4 and the polishing surface 40/50 of the polishing puck 6 is engaged with the guide tracks 16 of the groove 10.

The polishing puck 6 as so positioned is slid in the direction of arrow A along the guide tracks 16 of the groove 10. As the polishing puck 6 is so slid, the optical fibers 178 and 180 contact the bender portion 18 (shown in FIG. 9B) and are bent. As the polishing puck 6 continues its slide along the guide tracks 16, the sharp-angled edge 20a (shown in FIG. 9B) of the scribe 20 (shown in FIG. 9B) contacts at the circumferences of the optical fibers 178 and 180 and introduces a flaw into the outer surface of each of the optical fibers 178 and 180. The stress of the bends, coupled with the introduction of the flaws, breaks the optical fibers 178 and 180 as they just extend through the polishing surface 40/50 of the polishing puck 6. For example, the optical fibers 178 and 180 after scribing and breaking protrude from about 10 µm to about 250 µm (or as otherwise desired) from the polishing surface 40/50.

In a step 312, the polishing puck 6 slides out of the guide tracks 16 onto the polishing surface 12 of the station base 4. The polishing surface 12 is, for example, a lapping film or other abrasive surface. The grit of the polishing surface 12 is chosen according to the desired polishing results, as is conventional. In the step 312, the polishing puck 6 is moved in patterns, as previously mentioned, across the polishing surface 12. Because the optical fibers 178 and 180 protrude from the polishing surface 40/50 of the polishing puck 6, the end-faces of the optical fibers 178 and 180 are polished via the movement of the polishing puck 6. As previously described, the pre-load for the polishing is achieved, for example, by bowing of the optical fibers 178 and 180 over the length of the fibers 178 and 180 from the fiber holder 172 to the end-faces. This pre-load can achieve uniform and consistent polishing results among multiple polishing efforts.

In a step 314, the polishing puck 6 is again mounted on the retaining ridge 14 of the station base 4 and the top 32 opened from the base 30. With the top 32 opened in this manner, the optical fibers 178 and 180 may be cleaned, for example, by manual adhesive or liquid solvent cleaners, such as HFE. To view the optical fibers 178 and 180 at their polished end-faces, the microscope viewer 200 is mounted on the polishing puck 6. The microscope viewer 200 is rotatable laterally and vertically to desirably view the optical fibers 178 and 180. After inspection, the microscope viewer 200 is removed from its mounting with the polishing puck 6.

In a step 316, the fiber holder 172 maintained in the socket fiber holder nest 38 is fitted with the housing 170. The posts 171 of the housing 170 are locked with the hooks 188 of the fiber holder 172, and the housing is pressed against the fiber holder 172. This locates the end-faces of the optical fibers 178 and 180 retained by the fiber holder 172 in fiber-alignment grooves of the housing 170. The fiber holder 172 and housing 170 assembly is then removed from the socket fiber holder nest 38 and fitted with the bottom piece 187 to complete the connector socket 114.

Figure 19:
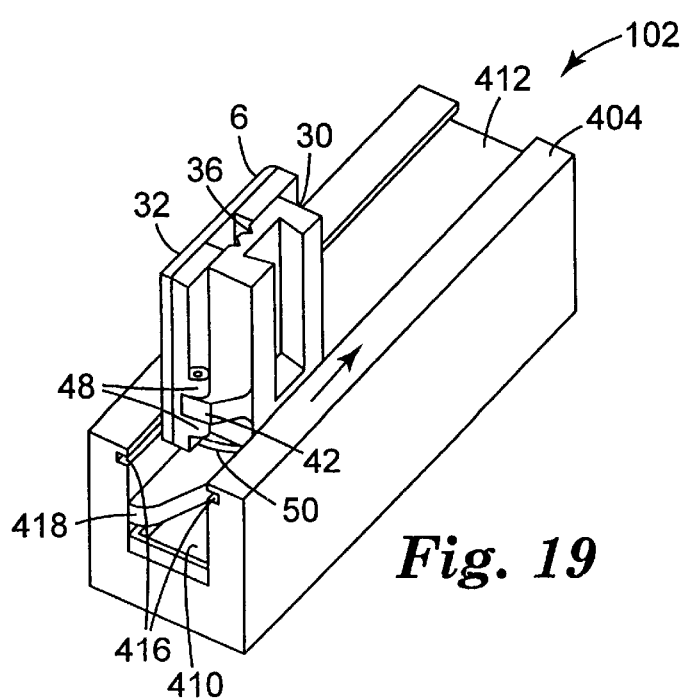
FIG. 19 is a perspective view of an alternative station base for use with the polishing puck like that of FIG. 8, which alternative station base provides a linear alignment for achieving both scribing and breaking of optical fibers extending from the polishing puck and polishing of the end-faces of the optical fibers after the scribing and breaking, according to embodiments of the present invention.

Referring to FIG. 19, an alternative station base 404 provides a linear polishing surface 412 at the end of a cleaving groove 410. The cleaving groove 410 includes a bender portion 418 and a scribe (not shown). Guide tracks 416 are provided at the top edges of the cleaving groove 410 for guiding the polishing puck 6. The linear polishing surface 412 is located at the end of the cleaving groove 410 in such manner that cleaving and polishing of optical fibers (not shown) maintained by a fiber holder (not shown) contained in the polishing puck 6 is accomplishable in a single-pass operation. Alternatively, the polishing puck 6 may be passed across the polishing surface 412 several times, as desired. Furthermore, the lapping film may be indexed so that it is replaced with each polishing operation or so that it is graded in such manner as to maintain relatively constant abrasive characteristics.

Figure 20A:
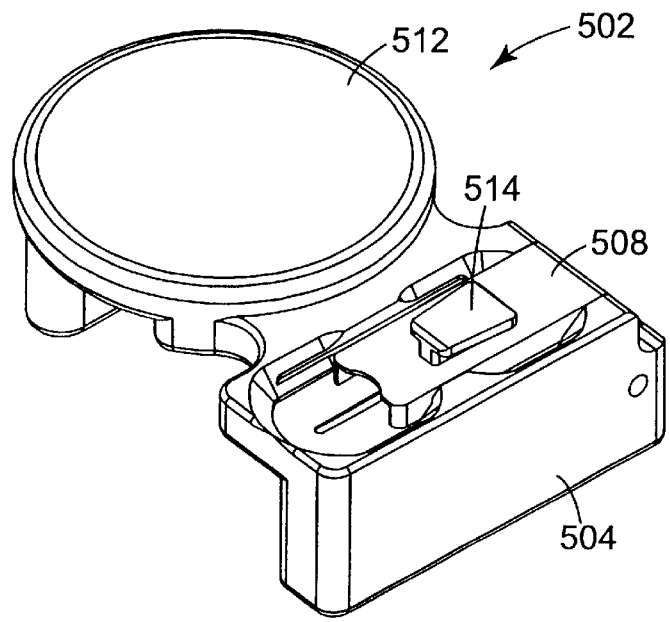
FIGS. 20A and B are perspective views of an alternative optical fiber preparation and connector assembly station.
Figure 20B:
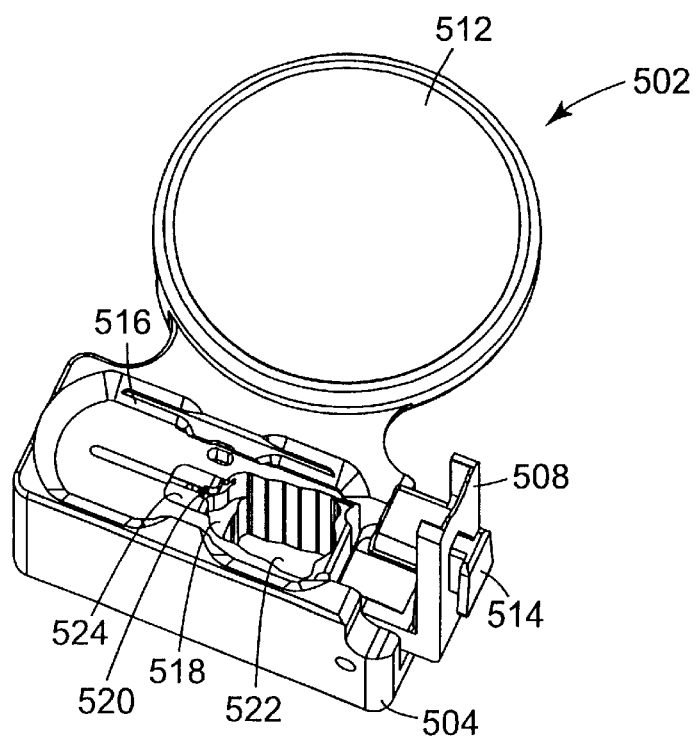
FIG. 20C is a longitudinal cross-section of the station of FIG. 20B taken through the fiber cleaving portion.
Figure 20C:
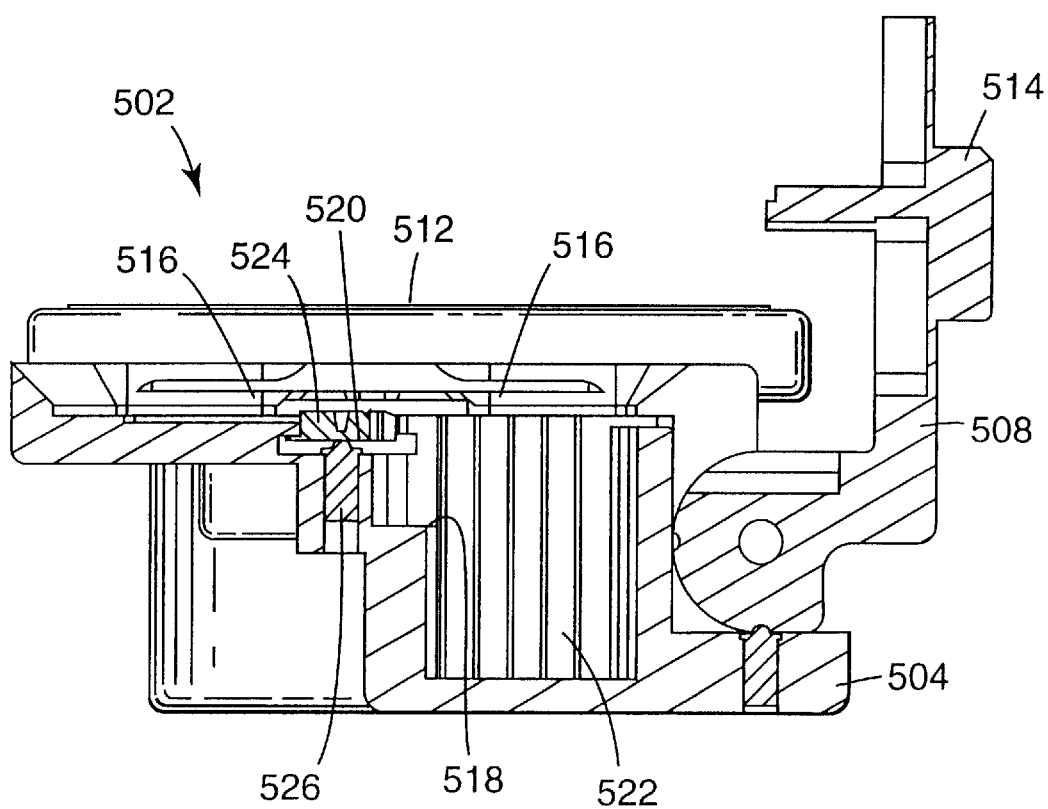

An alternative optical fiber preparation and connector assembly station 502 is illustrated in perspective views in FIGS. 20A and B, and in a longitudinal cross section of the fiber cleaving portion of the station in FIG. 20C. Station 502 is an alternative design of station 2 described above that includes a base 504 and a polishing surface 512. Base 504 may include means (such as a tapered dovetail, not shown) for releasably attaching a fiber holding tool or puck 506, which is similar to puck 6 described above, for storage under polishing surface 512, for example. The top of base 504 may include a cleaver door 508 mounted to base 504 so as to pivot between a closed position shown in FIG. 20A and an open position shown in FIGS. 20B and C. The top of door 508 may include a utility dovetail 514 for releasably mounting puck 506 during operations of fiber holder placement, fiber insertion, fiber holder actuation (if applicable), and fiber end-face inspection and/or cleaning. In the closed position, cleaver door 508 can provide protection for the fiber cleaving components, including guide tracks 516, a fiber stresser or bender 518, and a scribe 520. Cleaver door 508 can also provide a cover for a fiber shard collector 522 that forms a well in base 504 adjacent fiber bender 518 and scribe 520.

The cleaving portion of station 502 is shown in more detail in the cross section of FIG. 20C. An edge of fiber shard collector 522 can form the fiber bender 518. The location of bender 518 with respect to scribe 520 determines the amount of stress on the fiber when it is cleaved, which can affect the shape of the cleaved end-face. Scribe 520, which comprises a hard material such as diamond, sapphire, ceramic, or carbide, for example, with a sharpened edge, is mounted on a scribe assembly 524 that may be biased upward toward guide tracks 516 by a spring 526. Spring 526 urges scribe assembly 524 into firm contact with a plate or face 540 of the holder or puck 506 (described below) which is moved along guide tracks 516 during the cleaving operation.

Figure 21B:
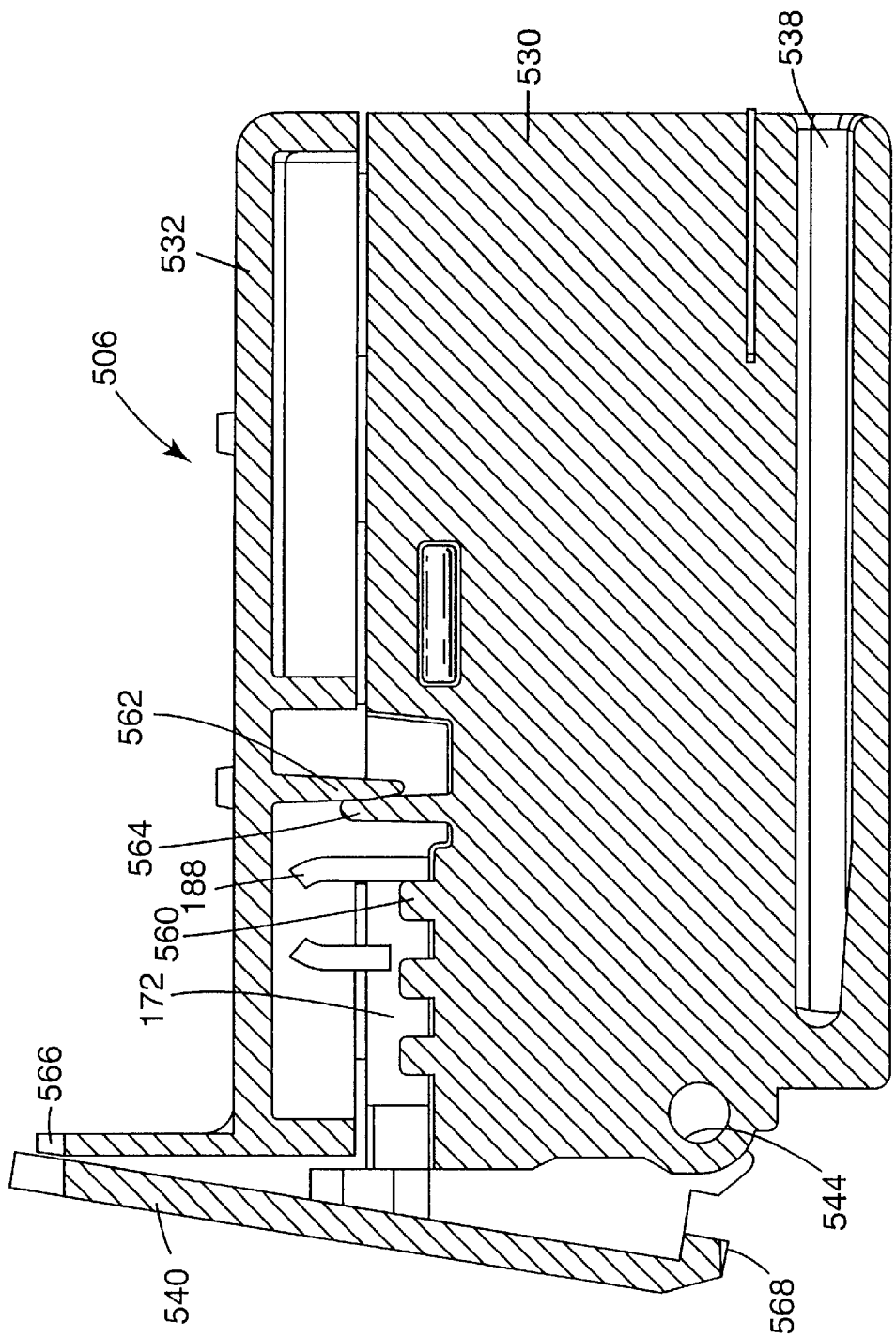
FIG. 21B is a longitudinal cross-section of the puck of FIG. 21A with the latch and face closed.

Referring to FIGS. 21A–B, alternative tool or puck 506 for holding at least one optical fiber includes a body 530, a cover or latch 532 rotatably attached to body 530 by a hinge 534 along a top edge of body 530, and a one-piece plate or face 540 pivotally attached to an end of body 530 by means of a pivot pin 544. Both latch 532 and face 540 are rotatable between open positions and closed positions. Latch 532 includes closure projections or hooks 548 for securing latch 532 to body 530 in the closed position. Body 530 may include an internal spring (not shown) for biasing face 540 alternately in the open and closed positions. FIG. 21A illustrates puck 506 in perspective with latch 532 open about 90 degrees (which typically can be opened about 180 degrees), face 540 in the open position, and the side of puck 506 in partial section to better illustrate the interior structures of body 530 and latch 532. FIG. 21B shows puck 506 in longitudinal cross section with both latch 532 and face 540 in the closed positions. Body 530 may include a dovetail slot 538 for mounting puck 506 to utility dovetail 514 or the storage dovetail under polishing surface 512 of station 502.

Face 540 may comprise a one-piece molded unit that includes fiber holes or ports 550 (that may have a diameter of about 0.005" for example) extending through face 540. Face 540 may be designed to "snap on" to pivot pin 544, allowing replacement of a worn face 540 without tools. Fiber ports 550 are designed to allow face 540 to be moved from a closed position (as shown in FIG. 21B) to an open position (as shown in FIG. 21A) without damaging the fibers. Fiber ports 550 have "lead-in" structures 552 on the inside of face 540 that facilitate inserting or threading the optical fibers through ports 550. In the closed position, face 540 may form a plane substantially perpendicular to the fibers extending through ports 550, or face 540 may be inclined at a predetermined angle (typically from 0 to about 16 degrees from perpendicular, for example, as shown in FIG. 21B) to provide for angle cleaving of the fibers.

Body 530 includes fiber lead-in grooves 536 that lead to a receptacle or nest in body 530 for receiving fiber holder 172, which includes hooks 188, as described above. Fiber holder 172 may comprise a base 173 for retaining clamping plates 181 and a cover 179 to secure fibers 178 and 180 in fiber holder 172 as described above in conjunction with FIG. 5. When using puck 506 to prepare fiber end-faces, latch 532 is opened and face 540 is placed in the closed position. Fiber holder 172 is placed in the nest of body 530 so that an extension of the hooks 188 on the side of holder 172 contacts a reference stop 560. The terminal ends of the fibers are then inserted from lead-in grooves 536, through clamping plates 181 (FIG. 5) positioned inside holder 172, and through fiber ports 550 to extend from face 540. Rotation of latch 532 to the fully closed position actuates fiber holder 172 to clamp the fibers securely. Upper posts 562 extending from latch 532 engage corresponding lower posts 564 extending from base 530 by wedging action as latch 532 is closed. Lower posts 564 contact the back or fiber entry end of fiber holder 172. Upper posts 562 may be stiffer than lower posts 564 and slightly offset from posts 564 so that the wedging action forces lower posts 564 against fiber holder 172 to urge fiber holder 172 toward face 540 until hooks 188 are firmly seated against reference stop 560. Biasing of fiber holder 172 in this manner is required to achieve accurate fiber length during the subsequent cleaving and polishing operations. In addition, manufacturing tolerances require some clearance between the components of latch 532 and body 530 forming hinge 534. The force from the wedging action between posts 562 and 564 removes any looseness or slack between latch 532 and body 530 to create a positional lock between the two when latch 532 is fully closed and secured by snap-fit closure hooks 548. Latch 532 may also include a guide tab 566 that, in conjunction with a guide edge 568 on the side of face 540 remote from guide tab 566 when face 540 is closed, is engaged by guide tracks 516 in station 502 to prevent face 540 from tilting during the cleaving operation.

The fiber cleaving operation is substantially the same as described above in conjunction with FIGS. 8 and 9. In this method, the fiber or fibers to be cleaved are secured in a holding tool that includes a plate with holes or ports through which the ends of the fibers extend. Typically, the ends of the fibers to be cleaved are bare (i.e., stripped of protective coatings) where they extend from the plate. The edges of the plate are designed to fit into guide tracks of a fiber cleaving device. The fiber cleaving device includes a fiber bender, which may comprise a bar, wall, or edge of the device, for example, that applies a stress to the fiber. A sharp-edged blade or scribe positioned within the device introduces a flaw in the fiber from which a crack propagates to cleave the fiber.

The cleaving device comprises a tool or jig that, when used with the fiber holding plate, produces consistent, repeatable fiber cleaves in one operation. The device includes a guide track that receives the fiber holding plate. The position of the fiber bender and the scribe are predetermined and maintained with precision on one side of the guide track, which extends past the bender and scribe. The fiber holding plate is inserted into the guide track with the fiber extending from the plate on the side of the track toward the bender and scribe. The fiber holding plate is then simply moved along the guide track toward the fiber bender and scribe. The fiber contacts the bender, which imparts a predetermined stress to the fibers, and then contacts the scribe, which imparts a precisely located flaw in the fiber to produce the cleave. The bender and scribe my be positioned to introduce the stress and flaw on a side of the fiber as it moves past the scribe or on the leading portion of the fiber in the direction of motion as it moves into the scribe. The fiber cleave can be produced by first stressing the fiber and then introducing the flaw, or by first introducing the flaw and then stressing the fiber. Also, the fiber holding plate can be moved along the guide track with the cleaving device stationary, or the cleaving device can be moved relative to a stationary fiber holding plate.

The scribe of the cleaving device can be mounted on a scribe assembly that is biased by a spring, for example, to be urged against the fiber holding plate as it moves along the guide track to maintain the scribe in a precise, predetermined position with respect to the fiber extending from the plate. The use of a fiber holding plate that is moved along a guide track past a fiber bender and a scribe produces a precise, consistent cleave with one simple motion of the tool. If the fiber holding plate retains a plurality of fibers extending through a corresponding plurality of ports in the plate positioned along a line in the direction of motion of the fiber holder in the guide tract of the cleaving device, the fibers are stressed and scribed, in sequence as the holder is moved along the guide track, to produce precise, consistent cleaves of the plurality of fibers in one motion of the tool.

Figure 22A:
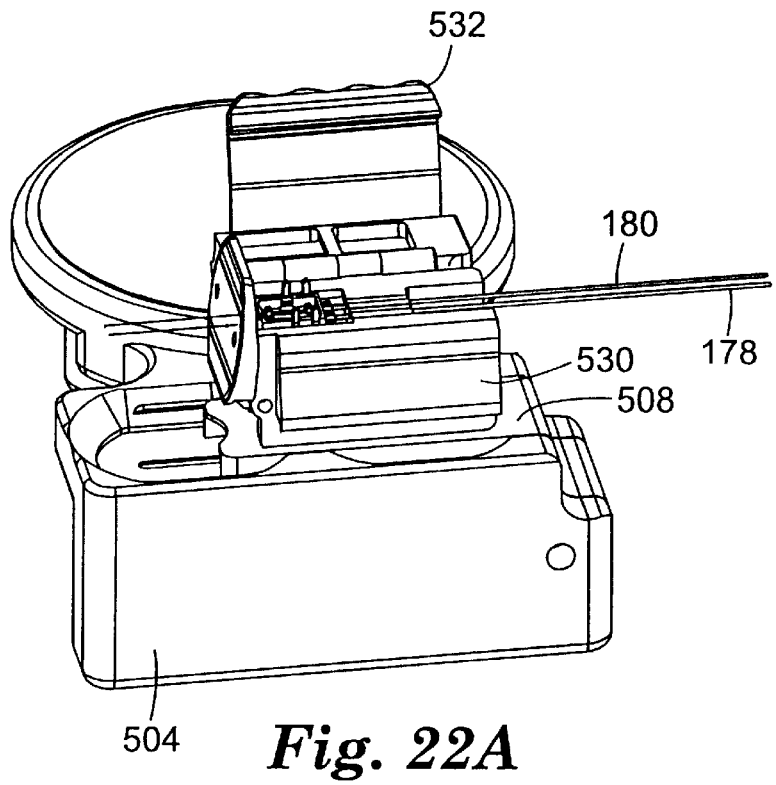
FIGS. 22A–D are perspective views various operations involving the station and puck of FIGS. 20 and 21.
Figure 22B:
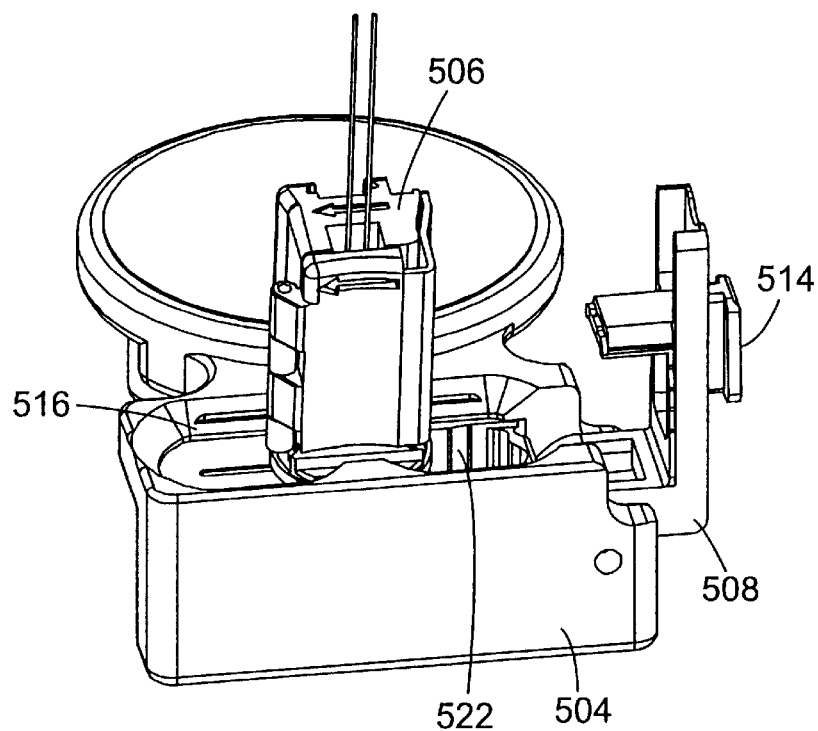
Figure 22C:
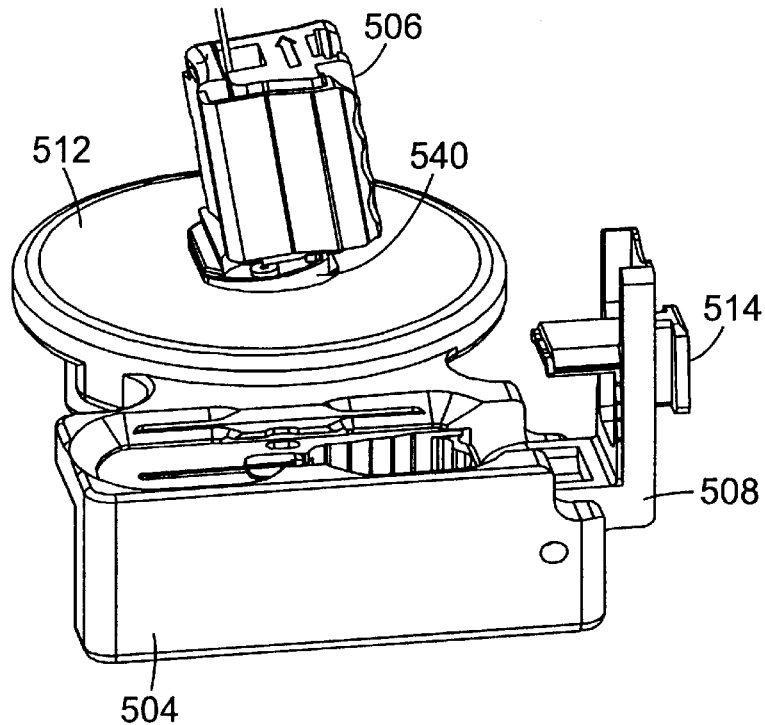
Figure 22D:
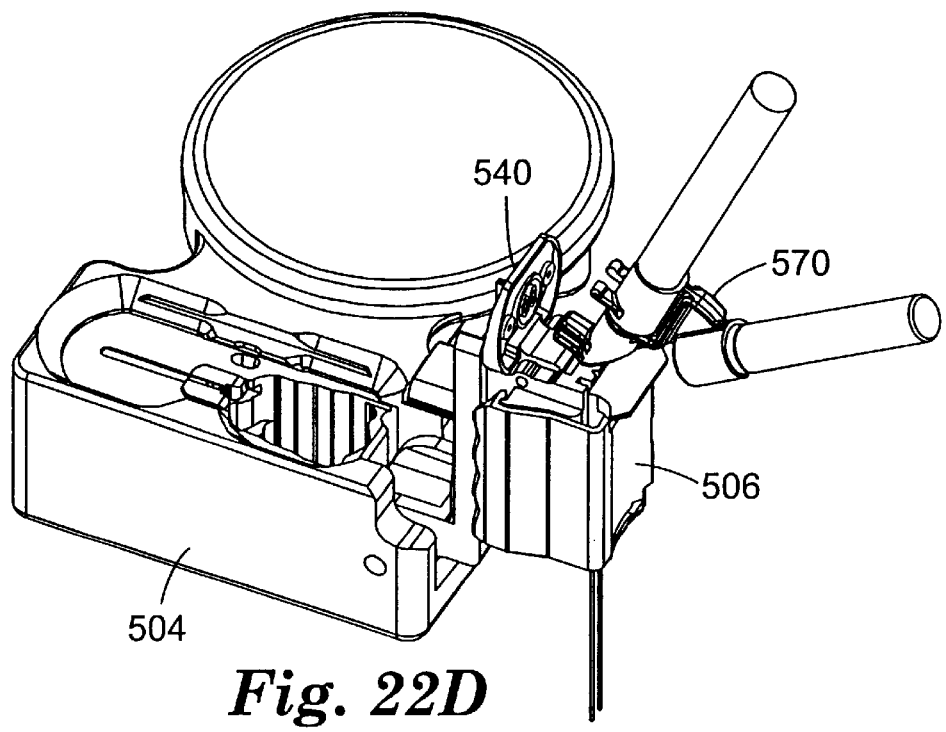

The operation of station 502 and puck 506 is substantially similar to that of the embodiments previously described. As shown in FIG. 22A, puck 506 may be mounted atop cleaver door 508 (in the closed position) with latch 532 open and face 540 closed so that fibers 178 and 180 can be threaded to extend through fiber holder 172 and ports 550 of face 540. With latch 532 closed, puck 506 is removed from utility dovetail 514 and, after opening door 508, positioned with the terminal ends of the fibers extending into shard collector 522 and guide tab 566 and guide edge 568 of face 540 entering guide tracks 516, as shown in FIG. 22B. By sliding puck 506 with face 540 inserted in guide tracks 516 (sliding puck 506 from right to left in FIG. 22B), the fibers are bent and stressed by fiber bender 518, in sequence, away from scribe 520 (i.e., opposite the direction of movement of puck 506 in guide tracks 516). Face 540 engages scribe assembly 524, which is urged upward against face 540 by spring 526 to ensure precise location of scribe 520 in relation to the fibers extending from face 540. As the fibers contact scribe 520, they are cleaved in sequence, with the fiber shards or stubs falling into collector 522 for later disposal. After the fibers have been cleaved, puck 506 is withdrawn from guide tracks 516 and the fiber ends may be polished by applying face 540 to polishing surface 512, as illustrated in FIG. 22C. After fiber polishing, puck 506 may be reattached to dovetail 514 on door 508 in the open position, as shown in FIG. 22D. After opening face 540 by rotation away from the fibers, an adapter 570 that supports a magnifier and a light source may be positioned on puck 506 for inspecting the quality and cleanliness of the cleaved and polished fiber end-faces. After inspecting the fibers, adapter 570 may be removed and door 508 may be closed to seal the fiber shards in collector 522 and to facilitate opening of latch 532. With latch 532 open, fiber holder 172 can be extracted from body 530 and, if desired, may be inserted directly into a connector socket or housing 170 (see FIG. 5), for example.

The arrangement of the functional sections of station 502 with respect to each other can be changed to adapt the tool for a particular need. For example, polishing surface 512 can be long and narrow to accommodate just the width of face 540 to perform a linear polish. With a linear polish, consumable lapping film with multiple grits can be used. The lapping film can be provided in roll form, using a take-up device to index the film as each new polish procedure is started, for example, to ensure an automatically supplied fresh abrasive surface. Polishing surface 512 can also be powered to move in a prescribed manner to provide automatic and uniform polishing. Also, the fiber cleaving section, including scribe 520 and bender 518, can be oriented differently (with the fibers horizontal instead of vertical during cleaving, for example).

Although illustrative embodiments of the invention have been shown and described, a wide range of modification, change, and substitution is contemplated in the foregoing disclosure and, in some instances, some features of the present invention may be employed without a corresponding use of the other features. Accordingly, it is appropriate that the appended claims be construed broadly and in a manner consistent with the scope of the invention.

We claim:

1. A device for preparing an optical fiber end-face, comprising:
    a base having bending means for creating a bend in an optical fiber and a scribe adapted to cleave the fiber in the vicinity of the bend;
    fiber shard collector comprising a well in said base adjacent said fiber bender;
    a polishing surface attached to said base; and
    a fiber holding tool releasably attachable to said base.

2. The device of claim 1, further comprising a guide track in said base adjacent said scribe for guiding said fiber holding tool past said fiber bender and said scribe for cleaving a fiber extending from said fiber holding tool.

3. The device of claim 1, further comprising a door attached to said base, said door rotatable between an open position and a closed position covering said shard collector.

4. The device of claim 2, wherein said fiber holding tool further comprises:
    a tool body having a nest for receiving a fiber holder for securing a fiber extending through said tool;
    a latch attached by a hinge to said body, said latch rotatable between an open position exposing said nest and a closed position covering said nest;
    a face comprising a plate pivotally attached to an end of said body, said face having at least one fiber port extending through the plate and a guide edge for engaging said guide track in said base, said face rotatable away from the end of said body to an open position for exposing the fiber; and
    said body having a reference stop and a lower post and said latch having an upper post, said upper post engaging said lower post by wedging action for urging said fiber holder against said reference stop when said latch is rotated to said closed position.

5. The device of claim 4, wherein said fiber holding tool includes means for positioning an adapter having a magnifier and a light source for inspecting the fiber.

6. A tool for preparing an optical fiber end-face, comprising:
    a tool body comprising a holding means for holding an optical fiber in the tool;
    a face comprising a plate pivotally attached to an end of said body, said face having at least one fiber port extending through said plate;
    a nest in said body for receiving a fiber holder for securing the fiber in the tool;
    a latch attached by a hinge to said body, said latch rotatable between an open position exposing said nest and a closed position covering said nest;
    a reference stop; and
    urging means for urging said fiber holder against said reference stop when said latch is rotated to said closed position.

7. The tool of claim 6, wherein said urging means comprises:
    a lower post extending from said body and adapted to contact said fiber holder at an end of said fiber holder remote from said face; and
    an upper post attached to said latch for engaging said lower post by wedging action when said latch is rotated to said closed position.

8. In combination with a fiber cleaving and polishing station, a tool for preparing an optical fiber end-face, comprising:
    tool body having a means for holding an optical fiber in the tool; and
    a face, comprising a plate pivotally attached to an end of said body, said face having at least one fiber port extending through said plate; wherein said body includes a mounting means for releasably mounting the tool onto said station.

9. A device for preparing an optical fiber end-face, comprising:
    a base having a cleaving means for cleaving an optical fiber; and
    a fiber shard collector comprising a well in said base adjacent said cleaving means; wherein said cleaving means comprises bending means for creating a bend in a fiber and a scribe adapted to create a groove in the fiber in the vicinity of the bend.

10. A device for preparing an optical fiber end-face, comprising:
    a base having a cleaving means for cleaving an optical fiber;
    a fiber shard collector comprising a well in said base adjacent said cleaving means; and
    a guide track in said base adjacent said cleaving means, said guide track being adapted to guide a fiber holding tool past said cleaving means so as to cleave a fiber extending from said tool.

11. A device for preparing an optical fiber end-face, comprising:
    a base having a cleaving means for cleaving an optical fiber;
    fiber shard collector comprising a well in said base adjacent said cleaving means; and
    a door attached to said base, said door being adjustable between an open position and a closed position; wherein said door covers said shard collector when it is in said closed position.

12. The device of claim 11, wherein said door is rotatable between said open position and said closed position.

13. A device for preparing an optical fiber end-face, comprising:
    a base having a cleaving means for cleaving an optical fiber;
    a fiber shard collector comprising a well in said base adjacent said cleaving means; and
    a fiber holding tool releasably attachable to said base; wherein said fiber holding tool comprises (i) a tool body having holding means for holding an optical fiber in the tool, and (ii) a face comprising a plate pivotally attached to an end of said body;

wherein said face has at least one fiber port extending through said plate and is rotatable away from the end of said body to an open position for exposing the fiber.

14. A device for preparing an optical fiber end-face, comprising:

a base having a cleaving means for cleaving an optical fiber;

a fiber shard collector comprising a well in said base adjacent said cleaving means; and a fiber holding tool releasably attachable to said base; wherein said fiber holding tool further comprises (i) a nest in said body for receiving a fiber holder for securing the fiber in the tool, and (ii) a latch attached by a hinge to said body, said latch being rotatable between an open position exposing said nest and a closed position covering said nest, and wherein said body has a reference stop and an urging means for urging said fiber holder against said reference stop when said latch is rotated to said closed position.

15. The device of claim 14, wherein said urging means comprises (i) a lower post extending from said nest to contact said fiber holder at an end of said fiber holder remote from said face, and (ii) an upper post attached to said latch for engaging said lower post by a wedging action when said latch is rotated to said closed position.

16. The device of claim 14, wherein said face of said fiber holding tool includes a guide edge for engaging said guide track in said base.

17. The device of claim 14, further comprising a polishing surface connected to said base.

* * * * *